(12) United States Patent
Song et al.

(10) Patent No.: US 12,436,385 B2
(45) Date of Patent: Oct. 7, 2025

(54) DIFFRACTIVE OPTICAL WAVEGUIDE, DESIGN METHOD FOR DIFFRACTIVE OPTICAL WAVEGUIDE, AND DISPLAY DEVICE

(71) Applicant: JIAXING UPHOTON OPTOELECTRONICS TECHNOLOGY CO., LTD., Tongxiang (CN)

(72) Inventors: Yuming Song, Tongxiang (CN); Lei Sui, Tongxiang (CN); Kehan Tian, Tongxiang (CN)

(73) Assignee: Jiaxing UPhoton Optoelectronics Technology Co., Ltd. (CN)

( * ) Notice: Subject to any disclaimer, the term of this patent is extended or adjusted under 35 U.S.C. 154(b) by 0 days.

(21) Appl. No.: 18/994,703

(22) PCT Filed: Mar. 15, 2024

(86) PCT No.: PCT/CN2024/081990
§ 371 (c)(1),
(2) Date: Jan. 15, 2025

(87) PCT Pub. No.: WO2024/188346
PCT Pub. Date: Sep. 19, 2024

(65) Prior Publication Data
US 2025/0264718 A1  Aug. 21, 2025

(30) Foreign Application Priority Data
Mar. 16, 2023 (CN) .......... 202310281767.5

(51) Int. Cl.
G02B 27/00 (2006.01)
G02B 27/01 (2006.01)
G02B 27/42 (2006.01)

(52) U.S. Cl.
CPC ..... G02B 27/0081 (2013.01); G02B 27/0012 (2013.01); G02B 27/0172 (2013.01); G02B 27/4205 (2013.01)

(58) Field of Classification Search
CPC ...... G02B 5/18; G02B 5/1809; G02B 5/1828; G02B 5/1842; G02B 5/1847; G02B 5/188;
(Continued)

(56) References Cited

U.S. PATENT DOCUMENTS

2012/0105962 A1  5/2012  Fattal et al.
2012/0194911 A1* 8/2012  Li .................. G02B 5/1809
                                                 359/566
(Continued)

FOREIGN PATENT DOCUMENTS

CN  108075352 A  5/2018
CN  110727049 A  1/2020
(Continued)

OTHER PUBLICATIONS

First Office Action of CN202310281767.5 dated Aug. 20, 2023 (Aug. 20, 2023), 9 pages.
(Continued)

Primary Examiner — Henry Duong
(74) Attorney, Agent, or Firm — Renner Kenner Grieve Bobak Taylor Weber Co, LPA

(57) ABSTRACT

A diffractive optical waveguide, a design method for the diffractive optical waveguide, and a display device are provided. The diffractive optical waveguide includes a waveguide substrate and a coupling-in grating. The coupling-in grating includes a plurality of coupling-in grating blocks arranged randomly and continuously, the plurality of coupling-in grating blocks have the same period, and at least two coupling-in grating blocks of the plurality of coupling-
(Continued)

in grating blocks have different duty cycles; a first coupling-in grating block of the at least two coupling-in grating blocks includes a plurality of grating units, and each grating unit has a first duty cycle; a second coupling-in grating block of the at least two coupling-in grating blocks includes a plurality of grating units, and each grating unit has a second duty cycle; the first duty cycle is different from the second duty cycle.

20 Claims, 8 Drawing Sheets

(58) Field of Classification Search
CPC ........ G02B 2005/1804; G02B 27/0081; G02B 27/0012; G02B 27/0172; G02B 27/4205
USPC ........................................ 359/566
See application file for complete search history.

(56) References Cited

U.S. PATENT DOCUMENTS

| | | | |
|---|---|---|---|
| 2015/0029588 A1* | 1/2015 | Fiorentino | G02B 27/4272 359/569 |
| 2015/0086163 A1 | 3/2015 | Valera et al. | |

FOREIGN PATENT DOCUMENTS

| | | | |
|---|---|---|---|
| CN | 111221068 A | 6/2020 |
| CN | 115494578 A | 12/2020 |
| CN | 113031142 A | 6/2021 |
| CN | 113625446 A | 11/2021 |
| CN | 114080550 A | 2/2022 |
| CN | 114545549 A | 5/2022 |
| CN | 115509015 A | 12/2022 |
| CN | 116400504 A | 7/2023 |

OTHER PUBLICATIONS

English translation of Notice of Grant of Patent Right for Invention for CN202310281767.5 dated Apr. 8, 2023 (Apr. 20, 2023), 12 pages.
Response to First Office Action of CN202310281767.5 dated Oct. 17, 2023 (Oct. 17, 2023), /\ pages.
English translation of Response to First Office Action of CN202310281767.5 dated Oct. 17, 2023 (Oct. 17, 2023), 12 pages.
Second Office Action of CN202310281767.5 dated Dec. 15, 2023 (Dec. 15, 2023), 7 pages.
English translation of Second Office Action of CN202310281767.5 dated Dec. 15, 2023 (Dec. 15, 2023), 9 pages.
Response to Second Office Action of CN202310281767.5 dated /\ 2024 (2024-/\-/\), /\ pages.
English translation of Response to Second Office Action of CN202310281767.5 dated /\ 2024 (2024-/\-/\), 15 pages.
Notice of Grant of Patent Right for Invention for CN202310281767.5 dated Apr. 8, 2024 (Apr. 8, 2024), 4 pages.
English translation of Notice of Grant of Patent Right for Invention for CN202310281767.5 dated Apr. 8, 2024 (Apr. 8, 2024), 5 pages.

* cited by examiner

DIFFRACTIVE OPTICAL WAVEGUIDE, DESIGN METHOD FOR DIFFRACTIVE OPTICAL WAVEGUIDE, AND DISPLAY DEVICE

CROSS-REFERENCE TO RELATED DISCLOSURE

The present disclosure claims the benefit of and priority to Chinese Patent Application No. 2023102817675, filed on Mar. 16, 2023, the disclosure of which is incorporated herein by reference in its entirety.

TECHNICAL FIELD

The present disclosure generally relates to the technical field of diffractive optics, and more particularly to a diffractive optical waveguide, a design method for the diffractive optical waveguide, and a display device.

BACKGROUND

With the high development of semiconductor technology, the way of interaction between human and computer is developing rapidly, and Augmented Reality (AR) display, among others, may provide multidimensional information to human beings and has been widely concerned. AR glasses are one of the important mediums in the field of augmented reality display. The diffractive optical waveguide has the advantages of a light and thin form, easy processing and reproduction, allowing production with high ability for mass production, and low cost, and has been gradually approved in the field of AR display, being expected to become the mainstream technology development direction of AR field in the future. The coupling-in grating is one of the essential components of the diffractive optical waveguide, which has a great influence on the efficiency and non-uniformity of the entire diffractive optical waveguide.

However, the inventors have recognized that the design of the coupling-in grating of the current conventional diffractive optical waveguide makes the efficiency and non-uniformity of the entire diffractive optical waveguide poor, so that when the wearer uses AR glasses with diffractive optical waveguide, the phenomenon of non-uniform image brightness usually occurs in the field of view, which affects the user experience.

Therefore, it is necessary to improve the diffractive optical waveguide to solve at least one technical problem.

SUMMARY

The present disclosure is proposed to solve at least one of the above-mentioned problems. Specifically, a first aspect of the present disclosure provides a diffractive optical waveguide for optical pupil expansion comprising a waveguide substrate and a coupling-in grating. The waveguide substrate comprises a coupling-in region. The coupling-in grating is disposed on or in the waveguide substrate and located in the coupling-in region, and is configured to couple input light into the waveguide substrate to cause the input light to propagate within the waveguide substrate through total reflection. Wherein the coupling-in grating comprises a plurality of coupling-in grating blocks arranged randomly and continuously, the plurality of coupling-in grating blocks have the same period, and at least two coupling-in grating blocks of the plurality of coupling-in grating blocks have different duty cycles. Wherein a first coupling-in grating block of the at least two coupling-in grating blocks comprises a plurality of grating units, and each grating unit of the first coupling-in grating block has a first duty cycle; a second coupling-in grating block of the at least two coupling-in grating blocks comprises a plurality of grating units, and each grating unit of the second coupling-in grating block has a second duty cycle. The first duty cycle is different from the second duty cycle.

Exemplarily, in a first direction, a duty cycle of at least one coupling-in grating block of the plurality of coupling-in grating blocks is greater than duty cycles of two coupling-in grating blocks adjacent to the at least one coupling-in grating block along the first direction; and/or in a second direction, a duty cycle of at least one coupling-in grating block of the plurality of coupling-in grating blocks is smaller than duty cycles of two coupling-in grating blocks adjacent to the at least one coupling-in grating block along the second direction.

Exemplarily, gratings of the plurality of coupling-in grating blocks have the same depth, and each of the plurality of coupling-in grating blocks comprises a plurality of grating units with the same depth; or the gratings of at least two coupling-in grating blocks of the plurality of coupling-in grating blocks have different depths, and each of the at least two coupling-in grating blocks comprises a plurality of grating units with the same depth.

Exemplarily, at least one of the plurality of coupling-in grating blocks is a rectangular grating block, a slanted grating block, a multi-step single-period grating block or a blazed grating block; and/or the types of the plurality of coupling-in grating blocks are the same or different.

Exemplarily, when at least two coupling-in grating blocks of the plurality of coupling-in grating blocks are slanted grating blocks, slanted gratings of the at least two coupling-in grating blocks have different tilt angles relative to a first surface of the waveguide substrate, and each of the at least two coupling-in grating blocks comprises a plurality of grating units with the same tilt angle.

Exemplarily, when at least two coupling-in grating blocks of the plurality of coupling-in grating blocks are multi-step single-period grating blocks, multi-step single-period gratings of the at least two coupling-in grating blocks have a different number of steps, and each of the at least two coupling-in grating blocks comprises a plurality of grating units with the same number of steps.

Exemplarily, when at least two coupling-in grating blocks of the plurality of coupling-in grating blocks are blazed grating blocks, first included angles between blazed surfaces of blazed grating teeth of the at least two coupling-in grating blocks and the first surface of the waveguide substrate are different, and each of the at least two coupling-in grating blocks comprises a plurality of grating units with the same first included angle.

Exemplarily, the number of the coupling-in grating blocks is 20 to 300; and/or the number of the grating units in each of the plurality of coupling-in grating blocks is 50 to 150.

Exemplarily, the coupling-in grating blocks directly irradiated by the input light have a duty cycle of 0.2 to 0.8; and/or the coupling-in grating blocks not directly irradiated by the input light have a duty cycle of 0.2 to 1.0.

Exemplarily, the coupling-in grating is a transmission coupling-in grating or a reflection coupling-in grating; and/or the coupling-in grating is a one-dimensional grating, a two-dimensional grating, or a combination grating of a one-dimensional grating and a two-dimensional grating.

Exemplarily, the first direction is the same as or different from the second direction.

A second aspect of the present disclosure provides a design method for the diffractive optical waveguide of the first aspect, comprising:

S101: determining a freedom degree of a duty cycle of a coupling-in grating of the diffractive optical waveguide according to grating parameters of a coupling-in grating to be optimized, wherein the grating parameters include a duty cycle, a period and a total reflection length of the coupling-in grating to be optimized, and the coupling-in grating to be optimized comprises a plurality of grating units with the same period and the same duty cycle;

S102: optimizing the coupling-in grating to be optimized by using a predetermined optimization algorithm according to the freedom degree until optimized coupling-in grating meets a preset condition;

S103: outputting design parameters of the optimized coupling-in grating, wherein the design parameters include the number of the coupling-in grating blocks, the duty cycle of each of the coupling-in grating blocks, and an arrangement mode of the coupling-in grating blocks.

Exemplarily, the step that until the optimized coupling-in grating meets a preset condition comprises: the diffraction efficiency and/or non-uniformity of the optimized coupling-in grating reaches a preset value.

Exemplarily, the predetermined optimization algorithm comprises: forward search algorithm of SA, PSO, GA or fmincon, or a feedback iteration algorithm accompanied by optimization.

Exemplarily, optimization is performed using an equal proportion scaling model of a diffractive optical waveguide to be optimized, wherein a thickness of the diffractive optical waveguide to be optimized is scaled using a first proportion, and a grating length of the coupling-in grating to be optimized is scaled using a second proportion.

Exemplarily, the freedom degree of the duty cycle is 0.2 to 1.0.

Exemplarily, the freedom degree of the duty cycle is 0.4 to 0.6.

A third aspect of the present disclosure provides a display device, comprising the diffractive optical waveguide of the first aspect, an optical machine, and a driving device configured to drive the optical machine to project image light onto the coupling-in grating of the diffractive optical waveguide.

Exemplarily, an optical axis of the image light projected by the optical machine is perpendicular to a surface of the waveguide substrate of the diffractive optical waveguide.

Exemplarily, the display device is a near-eye display device comprising a lens including the diffractive optical waveguide and a frame for holding the lens close to eyes.

Exemplarily, the display device is an augmented reality display device or a virtual reality display device.

The diffractive optical waveguide for optical pupil expansion of the present disclosure is configured such that the coupling-in grating comprises a plurality of coupling-in grating blocks arranged randomly and continuously, the plurality of coupling-in grating blocks have the same period, and at least two coupling-in grating blocks of the plurality of coupling-in grating blocks have different duty cycles; a first coupling-in grating block of the at least two coupling-in grating blocks comprises a plurality of grating units, and each grating unit of the first coupling-in grating block has a first duty cycle; a second coupling-in grating block of the at least two coupling-in grating blocks comprises a plurality of grating units, and each grating unit of the second coupling-in grating block has a second duty cycle; and the first duty cycle is different from the second duty cycle. Thus, it is possible to effectively improve the diffraction efficiency and non-uniformity of the input light coupled into the diffractive optical waveguide from different angles. This enables different fields of view of each input light to achieve better brightness non-uniformity and color non-uniformity to effectively improve the phenomenon of different imaging brightness in different fields of view and effectively improve the comprehensive coupling-in efficiency of the coupling-in grating. Consequently, it is beneficial to improve the efficiency and non-uniformity of the entire diffractive optical waveguide, so as to effectively improve the phenomenon of uneven light and dark changes of the image transmitted through the diffractive optical waveguide in the wearer's field of view, to improve the display effect of a display device comprising the diffractive optical waveguide, and thus to effectively improve the use experience of user.

The design method for the above diffractive optical waveguide of the present disclosure determines a freedom degree of a duty cycle of a coupling-in grating of the diffractive optical waveguide according to grating parameters of a coupling-in grating to be optimized which comprises a plurality of grating units with the same period and the same duty cycle, optimizes the coupling-in grating to be optimized by using a predetermined optimization algorithm according to the freedom degree until optimized coupling-in grating meets a preset condition, and outputs design parameters of the optimized coupling-in grating, wherein the design parameters include the number of the coupling-in grating blocks, the duty cycle of each of the coupling-in grating blocks, and an arrangement mode of the coupling-in grating blocks. Then, the diffractive optical waveguide comprising the optimized coupling-in grating can be designed based on the design parameters, such that the optimized diffractive optical waveguide can effectively improve the diffraction efficiency and non-uniformity of the input light coupled into the diffractive optical waveguide from different angles. This enables different fields of view of each input light to achieve better brightness non-uniformity and color non-uniformity to effectively improve the phenomenon of different imaging brightness in different fields of view and effectively improve the comprehensive coupling-in efficiency of the coupling-in grating. Consequently, it is beneficial to improve the efficiency and non-uniformity of the entire diffractive optical waveguide, so as to effectively improve the phenomenon of uneven light and dark changes of the image transmitted through the diffractive optical waveguide in the wearer's field of view, to improve the display effect of the display device comprising the diffractive optical waveguide, and thus to effectively improve the use experience of the user.

Since the display device of the present disclosure comprises the aforementioned diffractive optical waveguide, it has substantially the same advantages as the diffractive optical waveguide.

BRIEF DESCRIPTION OF THE DRAWINGS

In order to illustrate the technical solutions in the embodiments of the present disclosure more clearly, the following briefly introduces the drawings that need to be used in the description of the embodiments. Obviously, the drawings described in the following are only some embodiments of the present disclosure. For those of ordinary skilled in the art, other drawings may also be obtained from these drawings without creative work.

DETAILED DESCRIPTION

Figure 1:
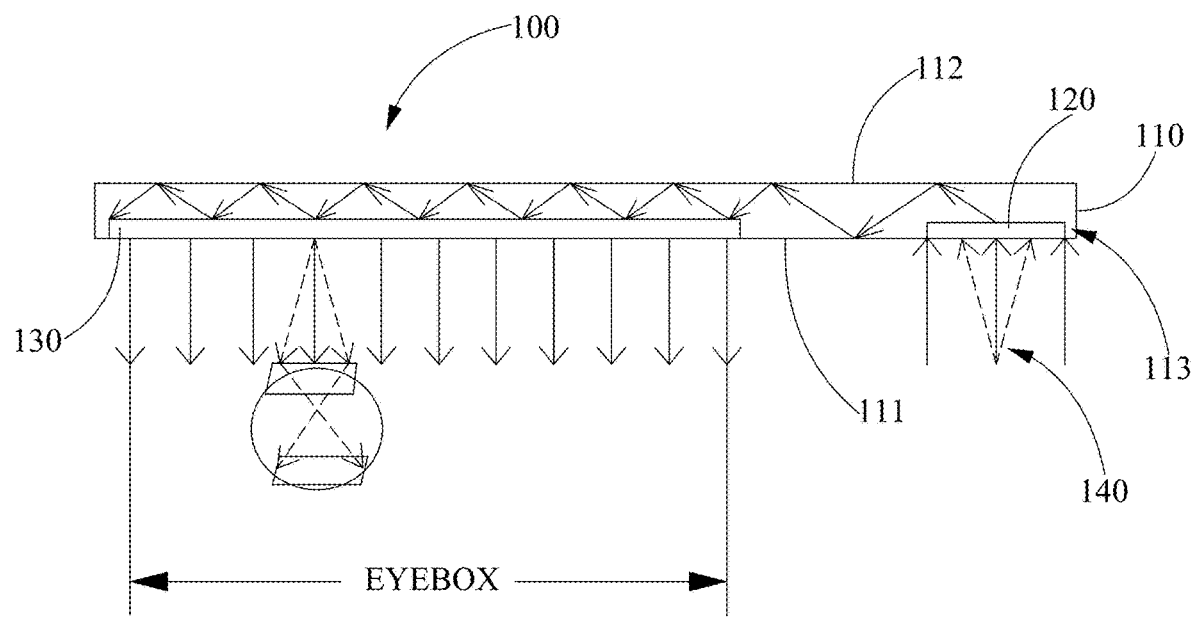
FIG. 1 shows a schematic diagram of a diffractive optical waveguide according to an embodiment of the present disclosure.

In order to make the objectives, technical solutions and advantages of the present disclosure more apparent, the exemplary embodiments according to the present disclosure will be described in detail below with reference to the accompanying drawings. Obviously, the described embodiments are only a part of the embodiments of the present disclosure, rather than all the embodiments of the present disclosure, and it is to be understood that the present disclosure is not limited by the example embodiments described herein. Based on the embodiments of the present disclosure described herein, all other embodiments obtained by those skilled in the art without creative work shall fall within the protection scope of the present disclosure.

In the following description, numerous specific details are set forth in order to provide a more thorough understanding of the present disclosure. However, it is obvious to those skilled in the art that the present disclosure may be implemented without one or more of these details. Some technical features well-known in the art are not described in other examples in order to avoid confusion with the present disclosure.

It is to be understood that the present disclosure may be implemented in various forms but should not be construed as being limited to the embodiments set forth herein. On the contrary, these embodiments are provided to make the disclosure thorough and complete and the scope of the disclosure be completely delivered to those skilled in the art.

The use of the terms provided herein is intended merely to illuminate the embodiments and does not pose a limitation on the disclosure. When they are used herein, the terms "a", "an" and "the" in the singular form are also intended to include the plural, unless otherwise indicated herein. It should still be understood that the terms "comprising" and/or "including" are used in the description to determine the presence of the features, integers, steps, operations, elements and/or components but not to exclude the presence or addition of one or more other features, integers, steps, operations, elements, components and/or groups. When they are used herein, the terms "and/or" include any or all combinations of related listed items.

In order to understand the present disclosure thoroughly, a detailed structure is provided in the following description so as to elucidate the technical solutions presented in the present disclosure. Alternative embodiments of the present disclosure are illustrated in detail as below. However, the present disclosure may further have other embodiments in addition to these detailed descriptions.

In order to solve the aforementioned technical problem, the present disclosure provides a diffractive optical waveguide for optical pupil expansion, comprising a waveguide substrate and a coupling-in grating. The waveguide substrate comprises a coupling-in region. The coupling-in grating is disposed on or in the waveguide substrate and located in the coupling-in region, and configured to couple input light into the waveguide substrate to cause the input light to propagate within the waveguide substrate through total reflection. Wherein the coupling-in grating comprises a plurality of coupling-in grating blocks arranged randomly and continuously, the plurality of coupling-in grating blocks have the same period, and at least two coupling-in grating blocks of the plurality of coupling-in grating blocks have different duty cycles. Wherein a first coupling-in grating block of the at least two coupling-in grating blocks comprises a plurality of grating units, and each grating unit of the first coupling-in grating block has a first duty cycle; a second coupling-in grating block of the at least two coupling-in grating blocks comprises a plurality of grating units, and each grating unit of the second coupling-in grating block has a second duty cycle. The first duty cycle is different from the second duty cycle.

The diffractive optical waveguide for optical pupil expansion of the present disclosure is configured such that the coupling-in grating comprises a plurality of coupling-in grating blocks arranged randomly and continuously, the plurality of coupling-in grating blocks have the same period, and at least two coupling-in grating blocks of the plurality of coupling-in grating blocks have different duty cycles; a first coupling-in grating block of the at least two coupling-in grating blocks comprises a plurality of grating units, and each grating unit of the first coupling-in grating block has a first duty cycle; a second coupling-in grating block of the at least two coupling-in grating blocks comprises a plurality of grating units, and each grating unit of the second coupling-in grating block has a second duty cycle; and the first duty cycle is different from the second duty cycle. Thus, it is possible to effectively improve the diffraction efficiency and non-uniformity of the input light coupled into the diffractive optical waveguide from different angles. This enables different fields of view of each input light to achieve better brightness non-uniformity and color non-uniformity to effectively improve the phenomenon of different imaging brightness in different fields of view and effectively improve the comprehensive coupling-in efficiency of the coupling-in grating. Consequently, it is beneficial to improve the efficiency and non-uniformity of the entire diffractive optical waveguide, so as to effectively improve the phenomenon of uneven light and dark changes of the image transmitted through the diffractive optical waveguide in the wearer's field of view, to improve the display effect of a display device comprising the diffractive optical waveguide, and thus to effectively improve the use experience of the user.

A diffractive optical waveguide 100, a design method for the diffractive optical waveguide 100, and a display device 300 of the present disclosure will be described below with reference to FIGS. 1 to 16. The features of the various embodiments of the present disclosure may be combined with each other without conflict.

The present disclosure provides a diffractive optical waveguide 100 for optical pupil expansion. Wherein FIG. 1 schematically illustrates an example of the diffractive optical waveguide 100 for optical pupil expansion, i.e., the diffractive optical waveguide 100, according to an embodiment of the present disclosure. As shown in FIG. 1, the diffractive optical waveguide 100 comprises a waveguide substrate 110. The waveguide substrate 110 may be made of glass, optical plastic, or other optical transmission materials.

Optionally, the waveguide substrate 110 may have a first surface 111 and a second surface 112 that are substantially flat, wherein the first surface 111 is opposite to the second surface 112. The first surface 111 may refer to the surface of the display device with the waveguide substrate 110 on the side facing the viewer's eyes. In the waveguide substrate 110, light may propagate in a direction substantially parallel to the first and second surfaces 111, 112 through total internal reflection.

Optionally, the shape of the waveguide substrate 110 may be any suitable shape, for example, a rectangle, a dumbbell shape, a butterfly shape, or the like. The thickness of the waveguide substrate 110 may be any suitable thickness, for example, the thickness of the waveguide substrate 110 is greater than or equal to 0.2 mm, and is less than or equal to 2 mm. The waveguide substrate 110 with this thickness range may provide good optical properties without being too thick or heavy to impact the use experience of the user. The specific thickness of the waveguide substrate 110 may be set to, for example, 0.3 mm, 0.6 mm, 0.9 mm, 1.2 mm, 1.5 mm or 1.8 mm. It is worth mentioning that the thickness of the waveguide substrate 110 may refer to the dimension of the waveguide substrate 110 in a direction substantially perpendicular to the first and second surfaces 111, 112.

Optionally, the waveguide substrate 110 comprises a coupling-in region 113 and a coupling-out region. The diffractive optical waveguide 100 of the present disclosure further comprises a coupling-in grating 120 and a coupling-out grating 130. The coupling-in grating 120 and the coupling-out grating 130 may be located on the same side of the waveguide substrate 110, for example, both disposed on the first surface 111 of the waveguide substrate 110, or located on different sides, i.e., located on the first surface 111 and the second surface 112, respectively.

Wherein, the coupling-in grating 120 is disposed on or in the waveguide substrate 110 and located in the coupling-in region 113, and is configured to couple input light 140 into the waveguide substrate 110 to cause it to propagate within the waveguide substrate 110 through total reflection, such that the light propagates to the coupling-out grating 130.

The coupling-in grating 120 may be an optical element including periodic structures, which may be fabricated by any suitable microfabrication process. For example, the grating may be fabricated on the surface or inside of the waveguide substrate 110 by photolithography, or be fabricated on the waveguide substrate 110 by nanoimprinting thereby forming a surface relief diffraction grating. Optionally, the period of the coupling-in grating 120 may be 350 nm to 600 nm, or other suitable period lengths.

The coupling-in grating 120 may be a transmission coupling-in grating or a reflection coupling-in grating. The coupling-in grating 120 may be a one-dimensional grating, such as a rectangular grating, or other suitable types of gratings such as a slanted grating, a blazed grating, a multi-step single-period grating, etc. The coupling-in grating 120 may also be a metasurface coupling-in structure. In some examples, the coupling-in grating 120 is a one-dimensional grating, a two-dimensional grating, or a combination grating of a one-dimensional grating and a two-dimensional grating.

The coupling-out grating 130 is disposed on or in the waveguide substrate 110 and located in the coupling-out region. The coupling-out grating 130 is used to couple at least a portion of the light propagating therein out of the waveguide substrate 110 by diffraction to allow the viewer's eyes to receive the coupled-out light. When the light entering the coupling-in grating 120 is, for example, the image light projected by a projector, the light coupled out from the coupling-out grating 130 is at least a portion of the image light, and the portion of the image light is guided to the viewer's eyes through the coupling-out grating 130 so that the image projected by the projector is visible to the viewer's eyes. Wherein, the coupling-out grating 130 plays the role of pupil expansion. After the coupling-out grating 130 receives a relatively thin incident light beam from the coupling-in grating 120, the coupling-out grating 130 continuously diffracts and expands the light beam in two directions in a plane while partially couples the light out of the waveguide substrate 110 for the purpose of optical pupil expansion in the plane, so that the viewer may observe the display information carried by the incident light beam in a relatively large eyebox (EB).

In some embodiments, the coupling-out grating 130 may be fabricated by any suitable microfabrication process. For example, the grating may be fabricated on the surface or inside of the waveguide substrate 110 by photolithography, or be fabricated on the waveguide substrate 110 by nanoimprinting thereby forming a surface relief diffraction grating. It is worth mentioning that various shapes of gratings shown in this disclosure are the shapes on the top surfaces of the gratings parallel to the surface of the diffractive optical waveguide 100 (i.e., the surface on which the coupling-out grating 130 or the coupling-in grating 120 is disposed), the shapes may be cross-sectional shapes taken in a plane substantially parallel to the surface of the diffractive optical waveguide 100, or may be projection shapes projected on a plane parallel to the surface of the diffractive optical waveguide 100.

The coupling-in grating of the diffractive optical waveguide has a great influence on the efficiency and non-uniformity of the entire diffractive optical waveguide.

Figure 2:
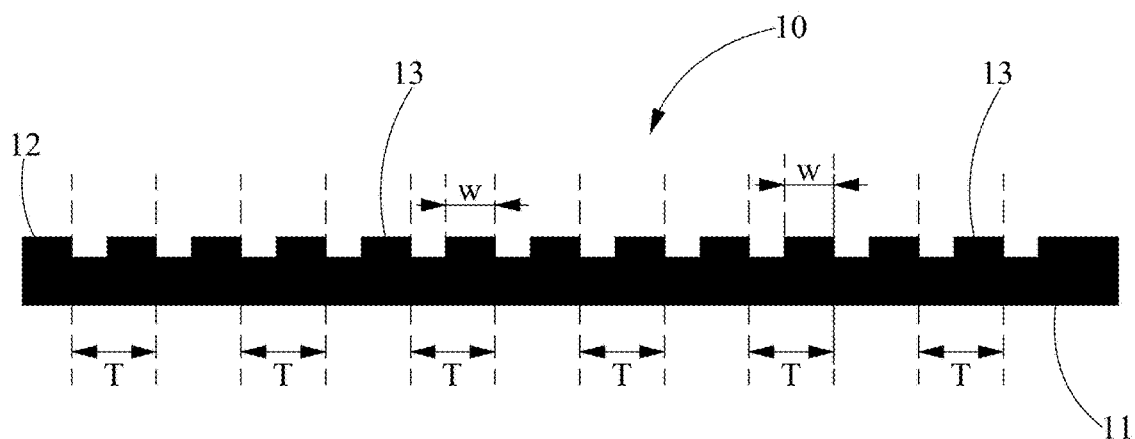
FIG. 2 shows a schematic diagram of a diffractive optical waveguide to be optimized with a coupling-in grating having the same period and the same duty cycle in the prior art.

FIG. 2 shows a schematic diagram of a coupling-in grating 12 of an existing conventional diffractive optical waveguide 10, such as the diffractive optical waveguide to be optimized. Wherein the coupling-in grating 12 is a one-dimensional rectangular grating. The coupling-in grating 12 comprises a plurality of grating segments 13 (i.e., the region filled with grating material on the waveguide substrate 11) arranged at periodic intervals. The arrangement period of the grating segments 13 is T, i.e., the grating period of the coupling-in grating 12 is T. The duty cycle f of the grating in each grating period T is the same, wherein the duty cycle f is the proportion of the grating segment 13 within the grating period T, i.e., the ratio of the width w of the grating segment 13 to the grating period T, namely, f=w/T.

That is to say, the coupling-in grating 12 of the existing conventional diffractive optical waveguide 10 is a coupling-in grating with the same period and the same duty cycle. The applicant has found through research that this type of coupling-in grating 12 is not conducive to improving the diffraction efficiency and non-uniformity of the input light coupled into the diffractive optical waveguide 10 from different angles, and thereby is not conducive to improving the efficiency and non-uniformity of the entire diffractive optical waveguide 10, which is difficult to improve the phenomenon that the image transmitted through the diffractive optical waveguide 10 presents non-uniform changes in light and dark in the wearer's field of view, and is therefore not conducive to improving the use experience of the user.

Figure 3:
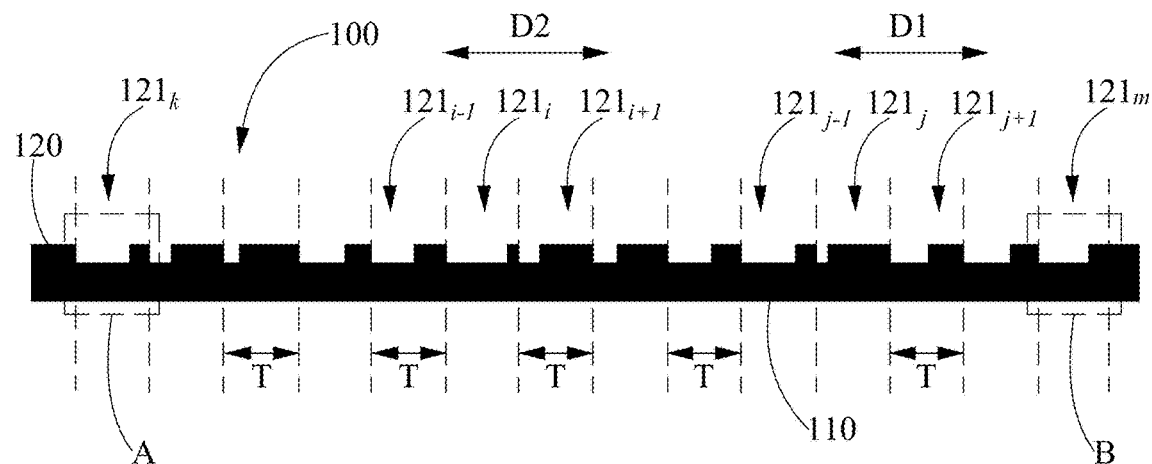
FIG. 3 shows a schematic diagram of a coupling-in grating of a diffractive optical waveguide according to an embodiment of the present disclosure.

After research, the applicant proposed a coupling-in grating 120 of a diffractive optical waveguide 100 according to an embodiment of the present disclosure as shown in FIG. 3. The coupling-in grating 120 is a rectangular grating, which comprises a plurality of coupling-in grating blocks (the portion between two adjacent dashed lines in FIG. 3) arranged randomly and continuously. Wherein the plurality of coupling-in grating blocks have the same period, and at least two coupling-in grating blocks of the plurality of coupling-in grating blocks have different duty cycles. And wherein a first coupling-in grating block of the at least two coupling-in grating blocks comprises a plurality of grating units, and each grating unit of the first coupling-in grating block has a first duty cycle; a second coupling-in grating block of the at least two coupling-in grating blocks comprises a plurality of grating units, and each grating unit of the second coupling-in grating block has a second duty cycle. The first duty cycle is different from the second duty cycle.

Figure 4:
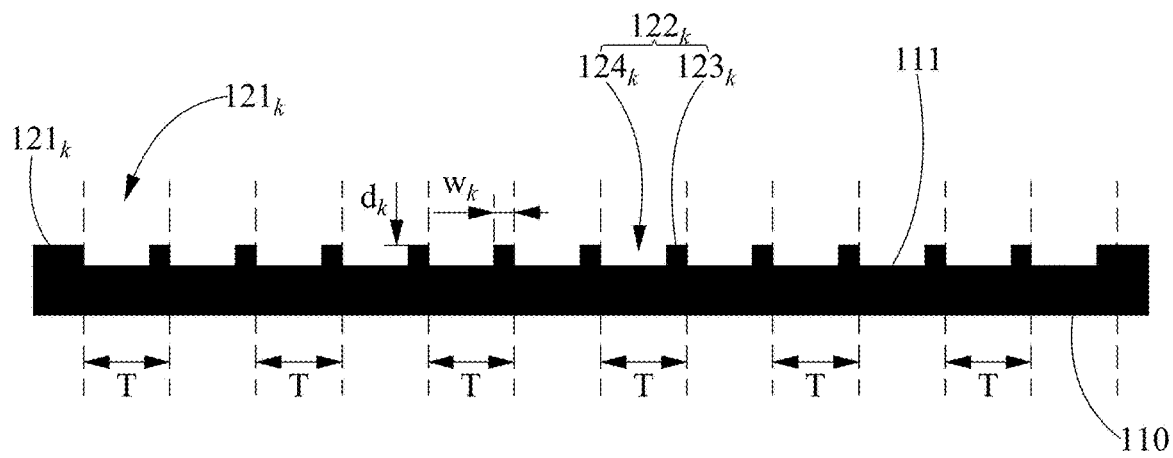
FIG. 4 is a partial enlarged view of A in FIG. 3.
Figure 5:
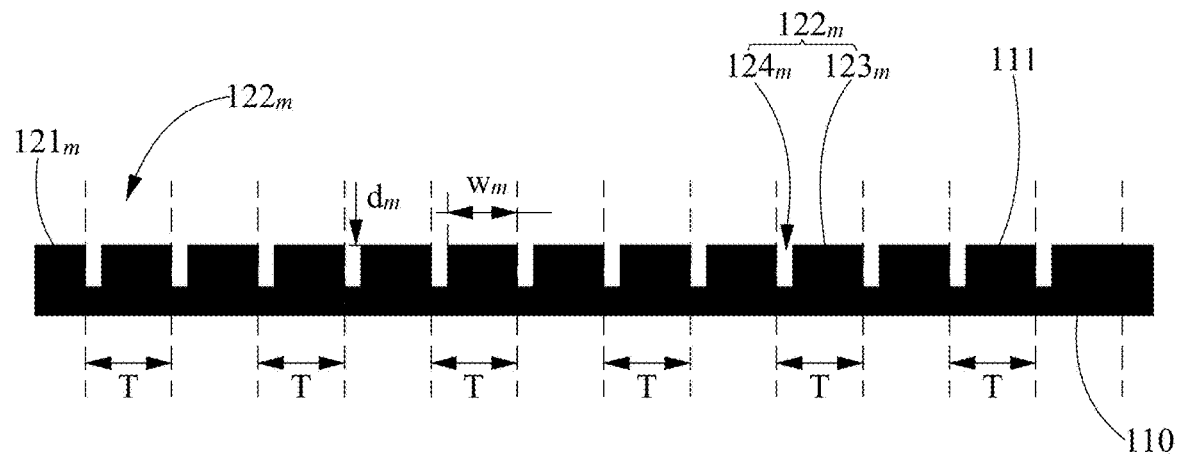
FIG. 5 is a partial enlarged view of B in FIG. 3.

Specifically, referring to FIGS. 3 to 5, the coupling-in grating 120 comprises a first coupling-in grating block $121_k$ and a second coupling-in grating block $121_m$. The duty cycle of the first coupling-in grating block $121_k$ is different from the duty cycle of the second coupling-in grating block $121_m$.

More specifically, referring first to FIGS. 3 and 4, the first coupling-in grating block $121_k$ comprises a plurality of grating units $122_k$. The grating unit $122_k$ comprises a grating segment $123_k$ (i.e., a region provided with grating material on or in the waveguide substrate 110) and a non-grating segment $124_k$ (i.e., a region provided with no grating material on or in the waveguide substrate 110). Wherein the grating segment $123_k$ is arranged periodically, and the arrangement period is $T_k$, i.e., the grating period of the first coupling-in grating block $121_k$ is $T_k$. Each grating unit $122_k$ has a first duty cycle $f_k$, wherein the first duty cycle $f_k$ is the proportion of the grating segment $123_k$ within the grating period $T_k$, i.e., the ratio of the width $w_k$ of the grating segment $123_k$ to the grating period $T_k$, namely, $f_k=w_k/T_k$.

Since each grating unit $122_k$ has the first duty cycle $f_k$, the duty cycle of first coupling-in grating block $121_k$ (the equivalent duty cycle of each grating unit $122_k$) is also $f_k$.

Referring to FIGS. 3 and 5 again, the second coupling-in grating block $121_m$ comprises a plurality of grating units $122_m$. The grating unit $122_m$ comprises a grating segment $123_m$ (i.e., a region provided with grating material on or in the waveguide substrate 110) and a non-grating segment $124_m$ (i.e., a region provided with no grating material on or in the waveguide substrate 110). Wherein the grating segment $123_m$ is arranged periodically, and the arrangement period is $T_m$, i.e., the grating period of the second coupling-in grating block $121_m$ is $T_m$. The period of the first coupling-in grating block $121_k$ is the same as that of the second coupling-in grating block $121_m$, so $T_k$ is the same as $T_m$.

Each grating unit $122_m$ has a second duty cycle $f_m$, wherein the second duty cycle $f_m$ is the proportion of the grating segment $123_m$ within the grating period $T_m$, i.e., the ratio of the width $w_m$ of the grating segment $123_m$ to the grating period $T_m$, namely, $f_m=w_m/T_m$.

Since each grating unit $122_m$ has the second duty cycle $f_m$, the duty cycle of second coupling-in grating block $121_m$ (the equivalent duty cycle of each grating unit $122_m$) is also $f_m$.

The first duty cycle $f_k$ is different from the second duty cycle $f_m$. Accordingly, the duty cycle of the first coupling-in grating block $121_k$ is also different from that of the second coupling-in grating block $121_m$.

In the illustrated embodiment, the first duty cycle $f_k$ is smaller than the second duty cycle $f_m$. It should be understood that the first duty cycle $f_k$ may also be set to be greater than the second duty cycle $f_m$.

In the embodiment shown in FIG. 3, the first coupling-in grating block $121_k$ is set as the first coupling-in grating block of the coupling-in grating 120, and the second coupling-in grating block $121_m$ is set as the last coupling-in grating block of the coupling-in grating 120. It should be understood that the arrangement positions of the first and second coupling-in grating blocks $121_k$, $121_m$ are not limited to the positions shown in FIG. 3. The specific positions of the two may be set as needed.

Continuing with reference to FIG. 3, the coupling-in grating 120 may also comprise a coupling-in grating block $121_i$ and a coupling-in grating block $121_j$ that are different from the first and second coupling-in grating blocks $121_k$, $121_m$. Similarly, the coupling-in grating block $121_i$ may comprise a plurality of grating units, each of which has a duty cycle $f_i$. Therefore, the duty cycle of the coupling-in grating block $121_i$ (i.e., the equivalent duty cycle of the plurality of grating units) is also $f_i$. The coupling-in grating block $121_j$ may comprise a plurality of grating units, each of which has a duty cycle $f_j$. Therefore, the duty cycle of the coupling-in grating block $121_j$ (i.e., the equivalent duty cycle of the plurality of grating units) is also $f_j$.

The duty cycle $f_i$ is different from the duty cycle $f_j$. Accordingly, the duty cycle of the coupling-in grating block $121_i$ is also different from that the coupling-in grating block $121_j$. In the illustrated embodiment, the duty cycle $f_i$ is smaller than the duty cycle $f_j$. It should be understood that the duty cycle $f_i$ may also be set to be greater than the duty cycle $f_j$.

Optionally, the first duty cycle $f_k$, the second duty cycle $f_m$, the duty cycle $f_i$, and the duty cycle $f_j$ are all set to be different.

In the embodiment shown in FIG. 3, along a first direction D1, the coupling-in grating blocks $121_i$ and $121_j$ are arranged at intervals, between which coupling-in grating blocks $121_{i+1}$ and $121_{j-1}$ are at least arranged. Similarly, it should be understood that the arrangement positions of the coupling-in grating blocks $121_i$ and $121_j$ are not limited to the positions shown in FIG. 3. The specific positions of the two may be set as needed.

A plurality of coupling-in grating blocks of the coupling-in grating 120 are arranged randomly and continuously, the periods of the plurality of coupling-in grating blocks are set to be the same, and the duty cycles of at least two coupling-in grating blocks of the plurality of coupling-in grating blocks are set to be different; and wherein a first coupling-in grating block of the at least two coupling-in grating blocks is set to comprise a plurality of grating units, and each grating unit of the first coupling-in grating block has a first duty cycle; a second coupling-in grating block of the at least two coupling-in grating blocks is set to comprise a plurality of grating units, and each grating unit of the second coupling-in grating block has a second duty cycle; and the first duty cycle is set to be different from the second duty cycle. Thus, it is possible to effectively improve the diffraction efficiency and non-uniformity of the input light 140 coupled into the diffractive optical waveguide 100 from different angles. This enables different fields of view of the input light 140 from various angles to achieve better brightness non-uniformity and color non-uniformity to effectively improve the phenomenon of different imaging brightness in different fields of view and effectively improve the comprehensive coupling-in efficiency of the coupling-in grating 120. Consequently, it is beneficial to improve the efficiency and non-uniformity of the entire diffractive optical waveguide 100, so as to effectively improve the phenomenon of uneven light and dark changes of the image transmitted through the diffractive optical waveguide 100 in the wearer's field of view, to improve the display effect of the display device comprising the diffractive optical waveguide 100, and thus to effectively improve the use experience of the user.

Optionally, the duty cycles of the respective coupling-in grating blocks in the embodiment shown in FIG. 3 are set to be different from each other, so as to further improve the diffraction efficiency and non-uniformity of the input light 140 coupled into the diffractive optical waveguide 100 from different angles.

Optionally, in the first direction D1, the duty cycle of at least one of the plurality of coupling-in grating blocks is greater than the duty cycles of the two coupling-in grating blocks adjacent thereto along the direction, so as to further effectively improve the diffraction efficiency of the coupling-in grating 120 for the input light 140 and achieve good non-uniformity.

Specifically, referring to FIG. 3, the coupling-in grating 120 comprises a coupling-in grating block $121_{j-1}$, the coupling-in grating block $121_j$ discussed above, and a coupling-in grating block $121_{j+1}$. Along the first direction D1, the coupling-in grating blocks $121_{j-1}$ and $121_{j+1}$ are disposed on both sides of the coupling-in grating block $121_j$ and are adjacent to the coupling-in grating block $121_j$.

As described above, the duty cycle of the coupling-in grating block $121_j$ is $f_j$. Similarly, the coupling-in grating blocks $121_{j-1}$ and $121_{j+1}$ may have the duty cycles $f_{j-1}$ (i.e., the equivalent duty cycle of a plurality of grating units of the coupling-in grating block $121_{j-1}$) and $f_{j+1}$ (i.e., the equivalent duty cycle of a plurality of grating units of the coupling-in grating block $121_{j+1}$), respectively. As can be seen from FIG. 3, the duty cycle $f_j$ is greater than the duty cycles $f_{j-1}$ and $f_{j+1}$.

Optionally, in the second direction D2, the duty cycle of at least one of the plurality of coupling-in grating blocks is smaller than the duty cycles of the two coupling-in grating blocks adjacent thereto along the direction, so as to further effectively improve the diffraction efficiency of the coupling-in grating 120 for the input light 140 and achieve good non-uniformity.

Specifically, with continued reference to FIG. 3, the coupling-in grating 120 comprises a coupling-in grating block $121_{i-1}$, the coupling-in grating block $121_i$ discussed above, and a coupling-in grating block $121_{i+1}$. Along the first direction D2, the coupling-in grating blocks $121_{i-1}$ and $121_{i+1}$ are disposed on both sides of the coupling-in grating block $121_i$ and are adjacent to the coupling-in grating block $121_i$.

As described above, the duty cycle of the coupling-in grating block $121_i$ is $f_i$. Similarly, the coupling-in grating blocks $121_{i-1}$ and $121_{i+1}$ may have the duty cycles $f_{i-1}$ (i.e., the equivalent duty cycle of a plurality of grating units of the coupling-in grating block $121_{i-1}$) and $f_{i+1}$ (i.e., the equivalent duty cycle of a plurality of grating units of the coupling-in grating block $121_{i+1}$), respectively. As can be seen from FIG. 3, the duty cycle $f_i$ is smaller than the duty cycles $f_{i-1}$ and $f_{i+1}$.

In the one-dimensional coupling-in grating 120 shown in FIG. 3, the first direction D1 is the same as the second direction D2. In other embodiments of the coupling-in grating 120, such as a two-dimensional coupling-in grating or the combined coupling-in grating of a one-dimensional grating and a two-dimensional grating, the first direction D1 and the second direction D2 may be the same or different.

Optionally, the number of coupling-in grating blocks of the coupling-in grating 120 is 20 to 300. For example, the number of coupling-in grating blocks of the coupling-in grating 120 is 50, 80, 120, 150, 180, 210, 250 or 280. This may provide a variety of grating block arrangements and a variety of duty cycle settings, so as to further effectively improve the diffraction efficiency of the coupling-in grating 120 for the input light 140 and achieve good non-uniformity. It should be understood that the number of the coupling-in grating blocks is not limited to the above range. That is, the number of the coupling-in grating blocks may also be less than 20, such as 10, or more than 300, such as 320.

Further optionally, the number of grating units in each of the plurality of coupling-in grating blocks is 50 to 150. For example, the number of the grating units is 60, 80, 100 or 120. This may provide a variety of grating block settings, so as to further effectively improve the diffraction efficiency of the coupling-in grating 120 for the input light 140 and achieve good non-uniformity. It should be understood that the number of the grating units is not limited to the above range. That is, the number of the grating units may also be less than 50, such as 30, or more than 150, such as 160.

When a device such as an optical machine projects image light onto the diffractive optical waveguide 100, for example, onto the coupling-in region 113 where the coupling-in grating 120 of the diffractive optical waveguide 100 is located, the coupling-in grating 120 may be divided into a region directly irradiated by the input light 140 and a region not directly irradiated by the input light 140. For the coupling-in grating blocks located in the region directly irradiated by the input light 140, i.e., the coupling-in grating blocks directly irradiated by the input light 140, the duty cycles thereof may be optionally set to 0.2 to 0.8, and optionally to 0.4 to 0.6, such as 0.4, 0.5 or 0.6. For the coupling-in grating blocks located in the region not directly irradiated by the input light 140, i.e., the coupling-in grating blocks not directly irradiated by the input light 140, the duty cycles thereof may be optionally set to 0.2 to 1.0, such as 0.4, 0.5, 0.6, 0.7, 0.8 or 0.9. In this way, the coupling-in grating 120 may be partitioned according to the distribution of the input light 140. By adjusting the duty cycles of the coupling-in grating blocks in different partitions, the diffraction efficiency and non-uniformity of the input light 140 coupled into the diffractive optical waveguide 100 from different angles may be further improved.

Furthermore, the grating depths of at least two of the plurality of coupling-in grating blocks are different, and each of the at least two coupling-in grating blocks includes a plurality of grating units with the same depth. Thus, the diffraction efficiency and non-uniformity of the input light 140 coupled into the diffractive optical waveguide 100 from different angles may be effectively improved by adjusting the grating depth. This enables different fields of view of the input light 140 from various angles to achieve better brightness non-uniformity and color non-uniformity to effectively improve the phenomenon of different imaging brightness in different fields of view and effectively improve the comprehensive coupling-in efficiency of the coupling-in grating 120. Consequently, it is beneficial to improve the efficiency and non-uniformity of the entire diffractive optical waveguide 100, so as to effectively improve the phenomenon of uneven light and dark changes of the image transmitted through the diffractive optical waveguide 100 in the wearer's field of view, to improve the display effect of the display device comprising the diffractive optical waveguide 100, and thus to effectively improve the use experience of the user.

Specifically, with continued reference to FIGS. 3 to 5, the grating segment $123_k$ of each grating unit $122_k$ of the first coupling-in grating block $121_k$ has a first depth $d_k$ (i.e., the distance between the top surface of the grating segment $123_k$ and the first surface 111 of the waveguide substrate 110). Therefore, the depth of the first coupling-in grating block $121_k$ (the equivalent depth of the grating segments $123_k$ of each grating unit $122_k$) is also $d_k$. The grating segment $123_m$ of each grating unit $122_m$ of the second coupling-in grating block $121_m$ has a second depth $d_m$ (i.e., the distance between the top surface of the grating segment $123_m$ and the first surface 111 of the waveguide substrate 110). Therefore, the depth of the second coupling-in grating block $121_m$ (the equivalent depth of the grating segments $123_m$ of each grating unit $122_m$) is also $d_m$.

The first depth $d_k$ is different from the second depth $d_m$. Accordingly, the depth of the first coupling-in grating block $121_k$ is also different from the depth of the second coupling-in grating block $121_m$.

In the illustrated embodiment, the first depth dx is smaller than the second depth $d_m$. It should be understood that the first depth dx may also be set to be greater than the second depth $d_m$.

Similarly, the grating segment of each grating unit of the coupling-in grating block $121_i$ may has a depth $d_i$. Therefore, the depth of the coupling-in grating block $121_i$ (i.e., the equivalent depth of the grating segments of each grating unit of the coupling-in grating block $121_i$) is also $d_i$. The grating segment of each grating unit of the coupling-in grating block $121_j$ may has a depth $d_j$. Therefore, the depth of the coupling-in grating block $121_j$ (i.e., the equivalent depth of the grating segments of each grating unit of the coupling-in grating block $121_j$) is also $d_j$.

The depth $d_i$ is different from the depth $d_j$. Accordingly, the depth of the coupling-in grating block $121_i$ is also different from the depth of the coupling-in grating block $121_j$. Specifically, the depth $d_i$ may be set to be smaller than the depth $d_j$. The depth $d_i$ may also be set to be greater than the depth $d_j$.

Optionally, the first depth $d_k$, the second depth $d_m$, the depth $d_i$, and the depth $d_j$ are all set to be different.

Optionally, the depths of the respective coupling-in grating blocks in the embodiment shown in FIG. 3 are set to be different from each other, so as to further improve the diffraction efficiency and non-uniformity of the input light 140 coupled into the diffractive optical waveguide 100 from different angles.

In some embodiments, the depths of the gratings of the plurality of coupling-in grating blocks of the coupling-in grating 120 may also be set to be the same. That is, each coupling-in grating block has the same grating depth and includes a plurality of grating units with the same depth, so as to facilitate the production of the coupling-in grating 120.

It should be understood that in some embodiments, the first coupling-in grating block $121_k$ may also be configured such that at least two of its plurality of grating units have the same depth, for example, the depth of the at least two grating units is the first depth. The second coupling-in grating block $121_m$ may also be configured such that at least two of its multiple grating units have the same depth, for example, the depth of the at least two grating units is the second depth.

The depth of the coupling-in grating block may be optionally set to a range of 0.1 μm to 1 μm, so as to further improve the diffraction efficiency and non-uniformity of the input light 140 coupled into the diffractive optical waveguide 100 from different angles by adjusting the depth.

In the embodiments shown in FIGS. 3 to 5, the coupling-in grating 120 is a rectangular grating, and the corresponding coupling-in grating blocks are rectangular grating blocks. However, the coupling-in grating 120 may also be set as a slanted grating, a multi-step single-period grating, or a blazed grating. Accordingly, the coupling-in grating blocks may be slanted grating blocks, multi-step single-period grating blocks, or blazed grating blocks, and the types of the plurality of coupling-in grating blocks are the same.

Figure 6:
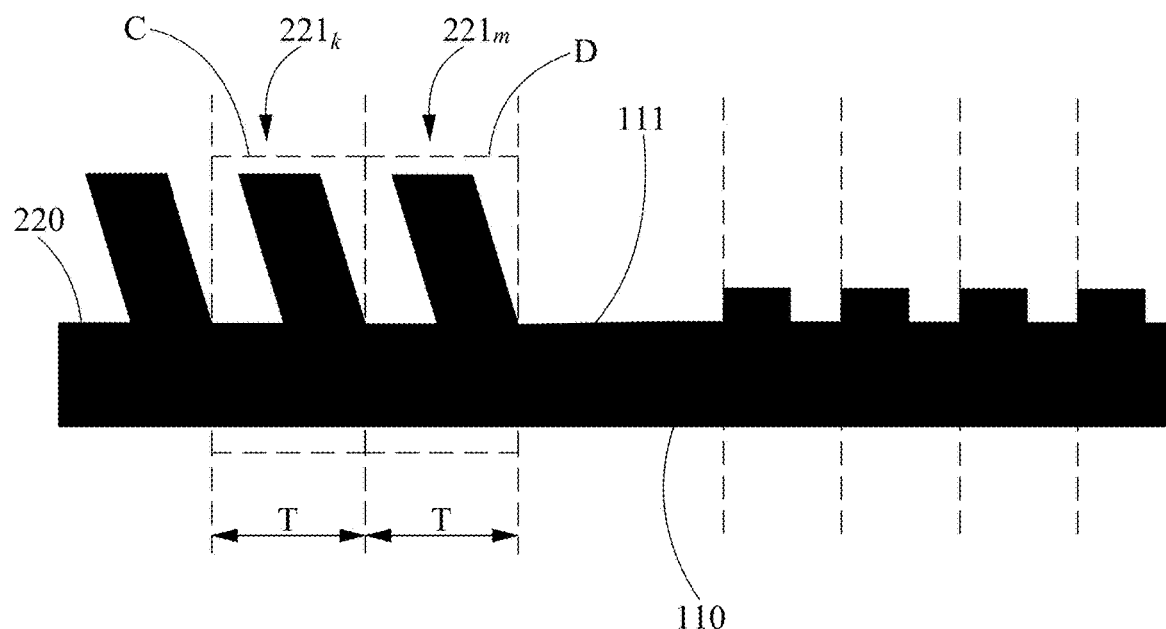
FIG. 6 shows a schematic diagram of a coupling-in grating including slanted grating blocks of a diffractive optical waveguide according to another embodiment of the present disclosure.

However, as shown in FIG. 6, the coupling-in grating 120 may also be set as a combination grating of such as a slanted grating and a rectangular grating. In this case, the plurality of coupling-in grating blocks comprise rectangular grating block(s) and slanted grating block(s), and the types of the plurality of coupling-in grating blocks are different. It should be understood that the coupling-in grating 120 may also be set as a combination grating of at least two of the following types of grating: rectangular grating, slanted grating, multi-step single-period grating and blazed grating. In this case, the coupling-in grating blocks correspondingly comprise at least two of the following types of blocks: rectangular grating block, slanted grating block, multi-step single-period grating block and blazed grating block.

That is, at least one of the plurality of coupling-in grating blocks may be set as a rectangular grating block, a slanted grating block, a multi-step single-period grating block or a blazed grating block.

The coupling-in grating 220 including slanted grating blocks in another embodiment of the present disclosure shown in FIG. 6 differs from the coupling-in grating 120 shown in FIGS. 3 to 5 in which all the coupling-in grating blocks are rectangular grating blocks in that the slanted gratings of the slanted grating blocks of the coupling-in grating 220 are tilted relative to the first surface 111 of the waveguide substrate 110. The above description of the arrangement mode, period, duty cycle and depth of the plurality of coupling-in grating blocks of the coupling-in grating 120 are also applicable to the plurality of coupling-in grating blocks of the coupling-in grating 220.

With continued reference to FIG. 6, when at least two of the plurality of coupling-in grating blocks are slanted grating blocks, the slanted gratings of the at least two coupling-in grating blocks have the different tilt angles relative to the first surface 111 of the waveguide substrate 110, and each of the at least two coupling-in grating blocks includes a plurality of grating units with the same tilt angle.

Figure 7:
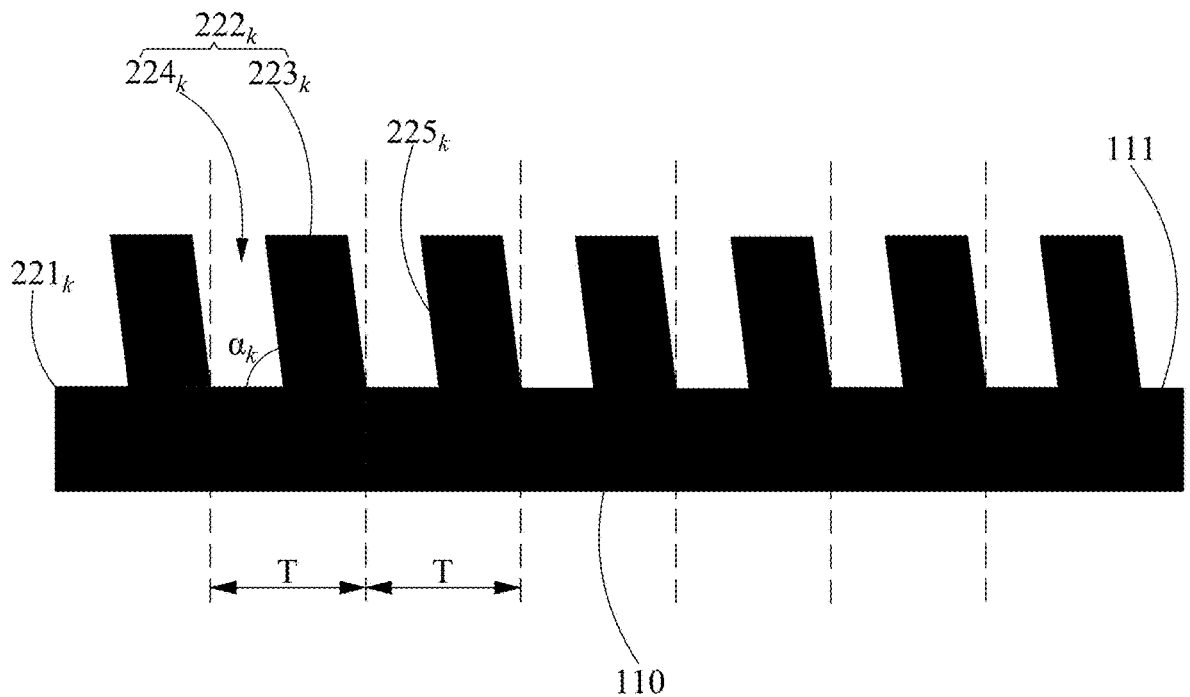
FIG. 7 is a partial enlarged view of C in FIG. 6.
Figure 8:
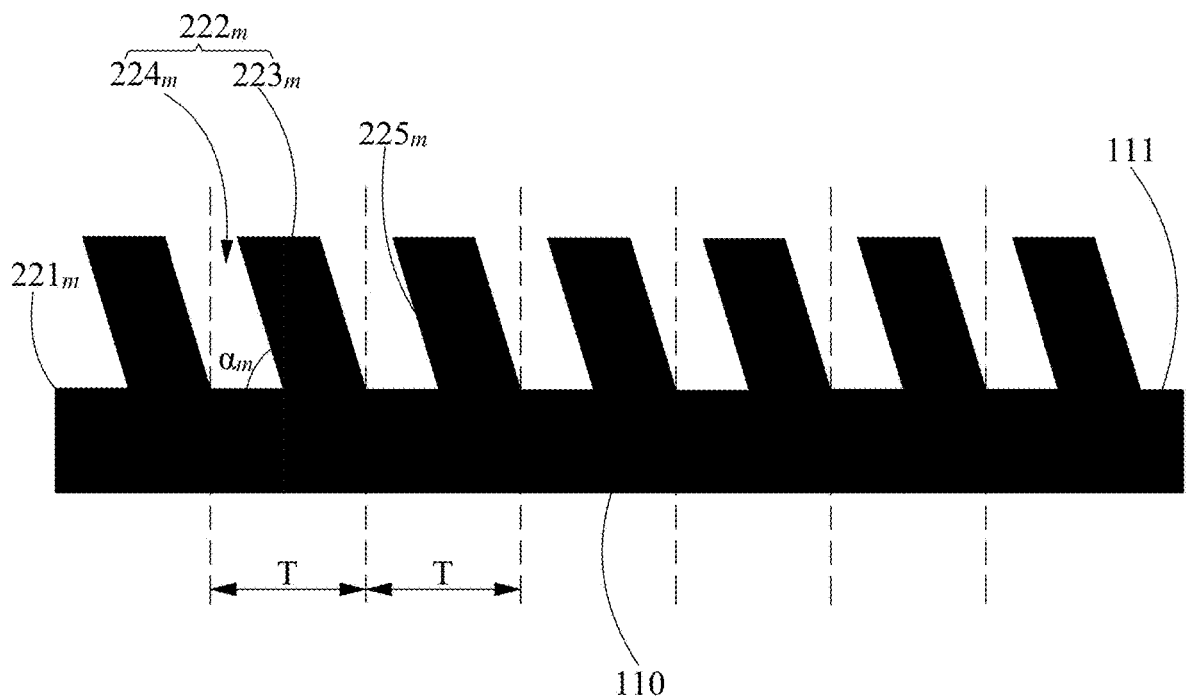
FIG. 8 is a partial enlarged view of D in FIG. 6.

Specifically, referring to FIGS. 6 to 8, the coupling-in grating 220 comprises a first slanted grating block $221_k$ and a second slanted grating block $221_m$. The tilt angle of the slanted grating of the first slanted grating block $221_k$ relative to the first surface 111 of the waveguide substrate 110 is different from the tilt angle of the slanted grating of the second slanted grating block $221_m$ relative to the first surface 111 of the waveguide substrate 110.

More specifically, referring first to FIGS. 6 and 7, the first slanted grating block $221_k$ comprises a plurality of grating units $222_k$. The grating unit $222_k$ comprises a grating segment $223_k$ (i.e., a region provided with grating material on or in the waveguide substrate 110, namely, the slanted grating of the first slanted grating block $221_k$) and a non-grating segment $224_k$ (i.e., a region provided with no grating material on or in the waveguide substrate 110). Wherein the included angle between the inclined edge $225_k$ of the grating segment $223_k$ and the first surface 111 of the waveguide substrate 110 is $\alpha_k$, i.e., the tilt angle of the grating unit $222_k$ relative to the first surface 111 of the waveguide substrate 110 is $\alpha_k$.

Since the tilt angle of each grating unit $222_k$ relative to the first surface 111 of the waveguide substrate 110 is $\alpha_k$, the tilt angle of the slanted grating of the first slanted grating block $221_k$ relative to the first surface 111 of the waveguide substrate 110 (the equivalent tilt angle of each grating unit $222_k$) is also $\alpha_k$.

Referring again to FIGS. 6 and 8, the second slanted grating block $221_m$ comprises a plurality of grating units $222_m$. The grating unit $222_m$ comprises a grating segment $223_m$ (i.e., a region provided with grating material on or in the waveguide substrate 110, namely, the slanted grating of the second slanted grating block $221_m$) and a non-grating segment $124_m$ (i.e., a region provided with no grating material on or in the waveguide substrate 110). Wherein the included angle between the inclined edge $225_m$ of the grating segment $223_m$ and the first surface 111 of the waveguide substrate 110 is $\alpha_m$, i.e., the tilt angle of the grating unit $222_m$ relative to the first surface 111 of the waveguide substrate 110 is $\alpha_m$.

Since the tilt angle of each grating unit $222_m$ relative to the first surface 111 of the waveguide substrate 110 is $\alpha_m$, the tilt angle of the slanted grating of the second slanted grating block $221_m$ relative to the first surface 111 of the waveguide substrate 110 (the equivalent tilt angle of each grating unit $222_m$) is also $\alpha_m$.

The included angle $\alpha_k$ is different from the included angle $\alpha_m$. Accordingly, the tilt angle of the slanted grating of the first slanted grating block $221_k$ relative to the first surface 111 of the waveguide substrate 110 is also different from the tilt angle of the slanted grating of the second slanted grating block $221_m$ relative to the first surface 111 of the waveguide substrate 110.

In the illustrated embodiment, the included angle $\alpha_m$ is smaller than the included angle $\alpha_k$. It should be understood that the included angle $\alpha_m$ may also be set to be greater than the included angle $\alpha_k$.

It should be understood that in some embodiments, the first coupling-in grating block $221_k$ may also be configured such that at least two of its plurality of grating units have the same tilt angle relative to the first surface 111 of the waveguide substrate 110, for example, at least two grating units have the tilt angle of $\alpha_k$ relative to the first surface 111 of the waveguide substrate 110. The second coupling-in grating block $221_m$ may also be configured such that at least two of its plurality of grating units have the same tilt angle relative to the first surface 111 of the waveguide substrate 110, for example, at least two grating units have the tilt angle of $\alpha_m$ relative to the first surface 111 of the waveguide substrate 110.

The tilt angle of the slanted grating of the slanted grating block relative to the first surface 111 of the waveguide substrate 110 may be optionally set to a range of 45° to 89°, such as 50°, 55°, 60°, 65°, 70°, 75° or 80°, etc., so as to further improve the diffraction efficiency and non-uniformity of the input light 140 coupled into the diffractive optical waveguide 100 from different angles by adjusting the tilt angle. It should be understood that the above tilt angle is not limited to the above range, that is, the tilt angle may also be set to be less than 45°, such as 40°, or set to be greater than 89°, such as 95°.

Figure 9:
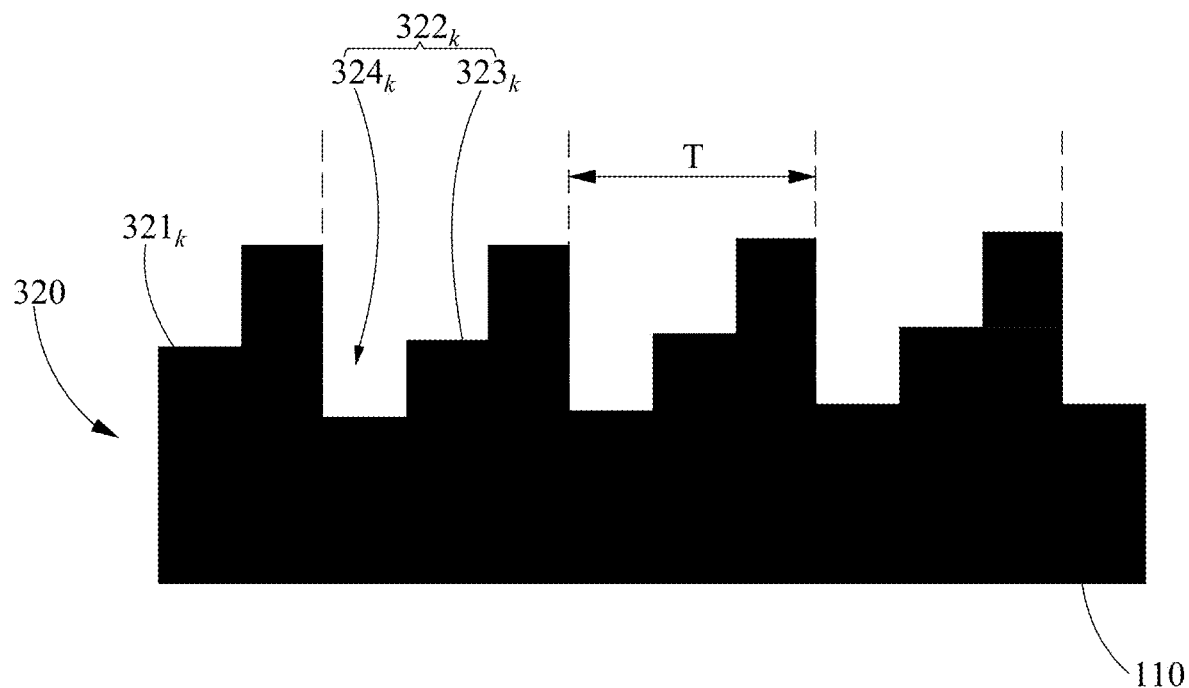
FIGS. 9 and 10 show schematic diagrams of multi-step single-period grating blocks of a coupling-in grating of a diffractive optical waveguide according to yet another embodiment of the present disclosure.
Figure 10:
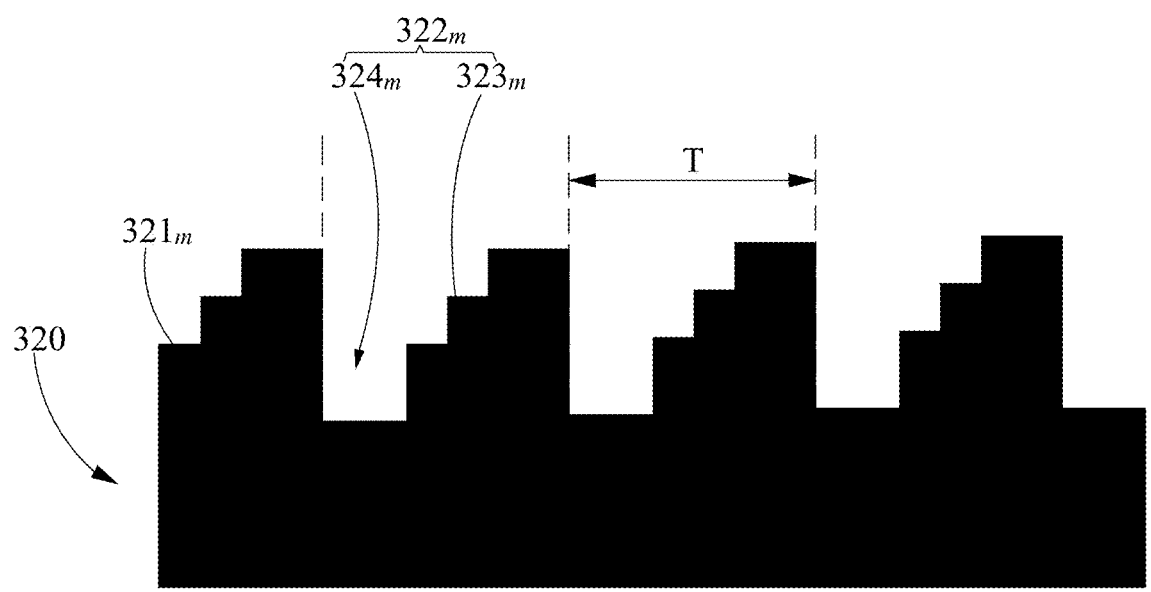

Referring to FIGS. 9 and 10 below, a coupling-in grating 320 comprising multi-step single-period grating blocks according to another embodiment of the present disclosure is shown. The difference between the coupling-in grating 320 and the coupling-in grating 120 shown in FIGS. 3 to 5 in which the coupling-in grating blocks are all rectangular grating blocks is that the grating of the coupling-in grating 320 is set as a multi-step grating. The above description of the arrangement mode, period and duty cycle of the plurality of coupling-in grating blocks of the coupling-in grating 120 are also applicable to the plurality of coupling-in grating blocks of the coupling-in grating 320.

When at least two of the plurality of coupling-in grating blocks are multi-step single-period grating blocks, the multi-step single-period gratings of the at least two coupling-in grating blocks have the different number of steps, and each of the at least two coupling-in grating blocks includes a plurality of grating units with the same number of steps.

Specifically, referring to FIGS. 9 and 10, the coupling-in grating 320 comprises a first multi-step single-period grating block $321_k$ and a second multi-step single-period grating block $321_m$. The number of steps of the multi-step single-period grating of the first coupling-in grating block $321_k$ is different from the number of steps of the multi-step single-period grating of the second coupling-in grating block $321_m$.

More specifically, referring first to FIG. 9, the first multi-step single-period grating block $321_k$ comprises a plurality of grating units $322_k$. The grating unit $322_k$ comprises a grating segment $323_k$ (i.e., a region provided with grating material on or in the waveguide substrate 110, namely, the multi-step single-period grating of the first multi-step single-period grating block $321_k$) and a non-grating segment $324_k$ (i.e., a region provided with no grating material on or in the waveguide substrate 110). Wherein the number of steps of the grating segment $323_k$ is $n_k$, that is, the number of steps of the grating unit $322_k$ is $n_k$.

Since the number of steps of each grating unit $322_k$ is $n_k$, the number of steps of the first multi-step single-period grating block $321_k$ (the equivalent number of steps of each grating unit $322_k$) is also $n_k$.

Referring again to FIG. 10, the second multi-step single-period grating block $321_m$ comprises a plurality of grating units $322_m$. The grating unit $322_m$ comprises a grating segment $323_m$ (i.e., a region provided with grating material on or in the waveguide substrate 110, namely, the multi-step single-period grating of the second multi-step single-period grating block $321_m$) and a non-grating segment $324_m$ (i.e., a region provided with no grating material on or in the waveguide substrate 110). Wherein the number of steps of the grating segment $323_m$ is $n_m$, that is, the number of steps of the grating unit $322_m$ is $n_m$.

Since the number of steps of each grating unit $322_m$ is $n_m$, the number of steps of the second multi-step single-period grating block $321_m$ (the equivalent number of steps of each grating unit $322_m$) is also $n_m$.

The number of steps $n_k$ is different from the number of steps $n_m$. Accordingly, the number of steps of the multi-step single-period grating of the first multi-step single-period grating block $321_k$ is also different from the number of steps of the multi-step single-period grating of the second multi-step single-period grating block $321_m$.

In the illustrated embodiment, the number of steps $n_m$ is greater than the number of steps $n_k$. It should be understood that the number of steps $n_m$ may also be set to be less than the number of steps $n_k$.

It should be understood that in some embodiments, the first coupling-in grating block $321_k$ may also be configured such that at least two of its plurality of grating units have the same number of steps, for example, at least two grating units have the number of steps $n_k$. The second coupling-in grating block $321_m$ may also be configured such that at least two of its plurality of grating units have the same number of steps, for example, at least two grating units have the number of steps $n_m$.

The number of steps of the multi-step single-period grating block may be optionally set to a range of 3 to 8, such as 4, 5, 6, 7, etc., so as to further improve the diffraction efficiency and non-uniformity of the input light 140 coupled into the diffractive optical waveguide 100 from different angles by adjusting the number of steps. It should be understood that the number of steps of the multi-step single-period grating block is not limited to the above range, that is, the number of steps of the multi-step single-period grating block may also be set to be less than 3, such as 2, or set to be more than 8, such as 10.

Figure 11:
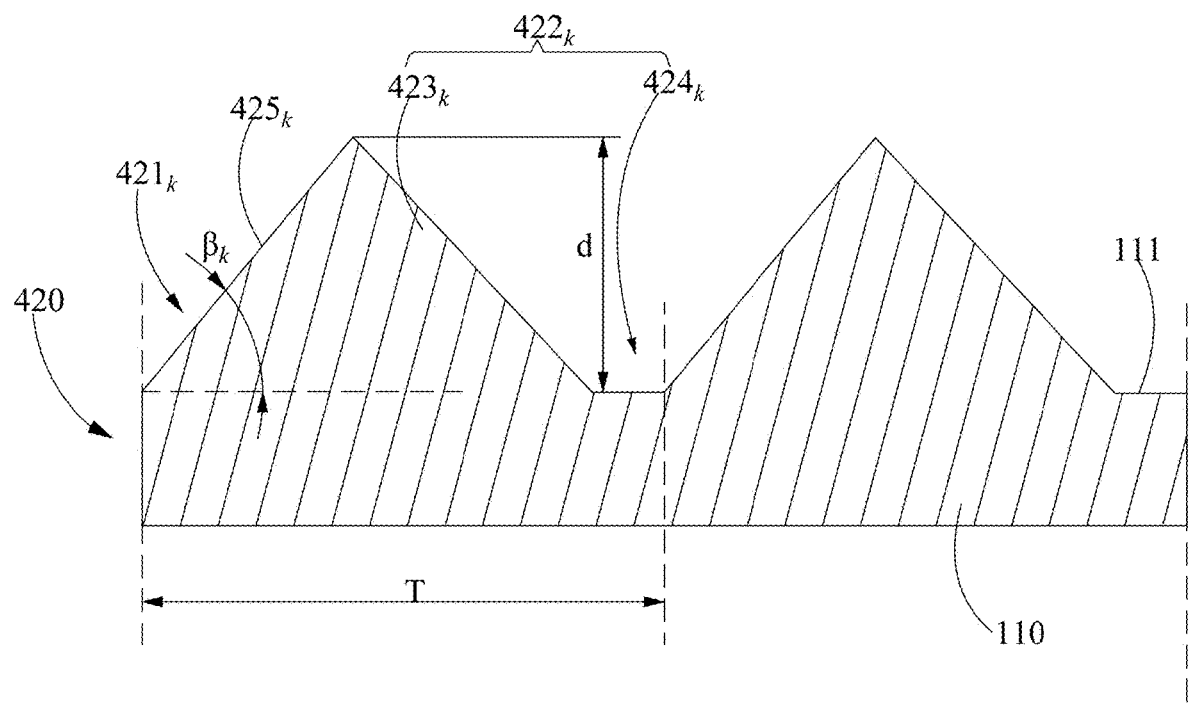
FIGS. 11 and 12 show schematic diagrams of blazed grating blocks of a coupling-in grating of a diffractive optical waveguide according to yet another embodiment of the present disclosure.
Figure 12:
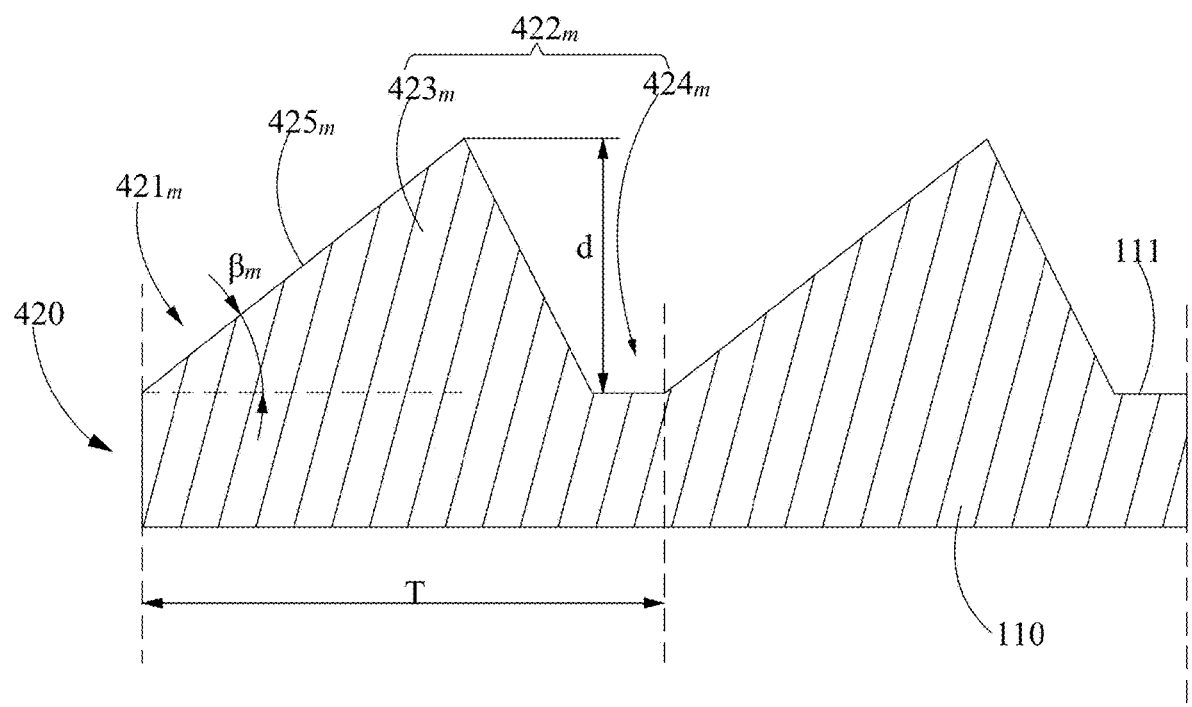

Referring to FIGS. 11 and 12 below, a coupling-in grating 420 comprising blazed grating blocks according to still another embodiment of the present disclosure is shown. The difference between the coupling-in grating 420 and the coupling-in grating 120 shown in FIGS. 3 to 5 in which the coupling-in grating blocks are all rectangular grating blocks is that the grating of the coupling-in grating 420 is set to a sawtooth shape. The above description of the arrangement mode, period, duty cycle and depth of the plurality of coupling-in grating blocks of the coupling-in grating 120 are also applicable to the multiple coupling-in grating blocks of the coupling-in grating 420.

When at least two of the plurality of coupling-in grating blocks are blazed grating blocks, the first included angles between the blazed surfaces of the blazed grating teeth of the at least two coupling-in grating blocks and the first surface 111 of the waveguide substrate 110 are different, and each of the at least two coupling-in grating blocks comprises a plurality of grating units with the same first included angle.

Specifically, referring to FIGS. 11 to 12, the coupling-in grating 420 comprises a first blazed grating block $421_k$ and a second blazed grating block $421_k$. The first included angle between the the blazed surface of the blazed grating tooth of the first coupling-in grating block $421_k$ and the first surface 111 of the waveguide substrate 110 is different from the first included angle between the blazed surface of the blazed grating tooth of the second coupling-in grating block $421_m$ and the first surface 111 of the waveguide substrate 110.

More specifically, referring first to FIG. 11, the first blazed grating block $421_k$ comprises a plurality of grating units $422_k$. The grating unit $422_k$ comprises a grating segment $423_k$ (or referred to as blazed grating tooth, i.e., a region provided with grating material on or in the waveguide substrate 110) and a non-grating segment $424_k$ (i.e., a region provided with no grating material on or in the waveguide substrate 110). Wherein the first included angle between a blazed surface $425_k$ of the grating segment $423_k$ and the first surface 111 of the waveguide substrate 110 is $\beta_k$, i.e., the first included angle between the grating unit $422_k$ and the first surface 111 of the waveguide substrate 110 is $\beta_k$.

Since the first included angle between each grating unit $422_k$ and the first surface 111 of the waveguide substrate 110 is $\beta_k$, the first included angle between the blazed surface of the blazed grating tooth of the first blazed grating block $421_k$ and the first surface 111 of the waveguide substrate 110 (the equivalent first included angle of each grating unit $422_k$) is also $\beta_k$.

Referring again to FIG. 12, the second blazed grating block $421_m$ comprises a plurality of grating units $422_m$. The grating unit $422_m$ comprises a grating segment $423_m$ (or referred to as blazed grating tooth, i.e., a region provided with grating material on or in the waveguide substrate 110) and a non-grating segment $424_m$ (i.e., a region provided with no grating material on or in the waveguide substrate 110). Wherein the first included angle between a blazed surface $425_m$ of the grating segment $423_m$ and the first surface 111 of the waveguide substrate 110 is $\beta_m$, i.e., the first included angle between the grating unit $422_m$ and the first surface 111 of the waveguide substrate 110 is $\beta_m$.

Since the first included angle between each grating unit $422_m$ and the first surface 111 of the waveguide substrate 110 is $\beta_k$, the first included angle between the blazed surface of the blazed grating tooth of the first blazed grating block $421_m$ and the first surface 111 of the waveguide substrate 110 (the equivalent first included angle of each grating unit $422_m$) is also Bm.

The first included angle $\beta_k$ is different from the first included angle $\beta_m$. Accordingly, the first included angle between the blazed surface of the blazed grating tooth of the first blazed grating block $421_k$ and the first surface 111 of the waveguide substrate 110 is also different from the first included angle between the blazed surface of the blazed grating tooth of the second blazed grating block $421_m$ and the first surface 111 of the waveguide substrate 110.

In the illustrated embodiment, the first included angle $\beta_m$ is smaller than the first included angle $\beta_k$. It should be understood that the first included angle $\beta_m$ may also be set to be greater than the first included angle $\beta_k$.

The first included angle between the blazed surface of the blazed grating tooth of the blazed grating block and the first surface 111 of the waveguide substrate 110 may be optionally set to a range of 45° to 90°, such as 50°, 55°, 60°, 65°, 70°, 75°, 80° or 85°, etc., so as to further improve the diffraction efficiency and non-uniformity of the input light 140 coupled into the diffractive optical waveguide 100 from different angles by adjusting the first included angle. It should be understood that the first included angle is not limited to the above range, that is, the first included angle may also be set to be less than 45°, such as 40°, or set to be greater than 90°, such as 95°.

Figure 16:
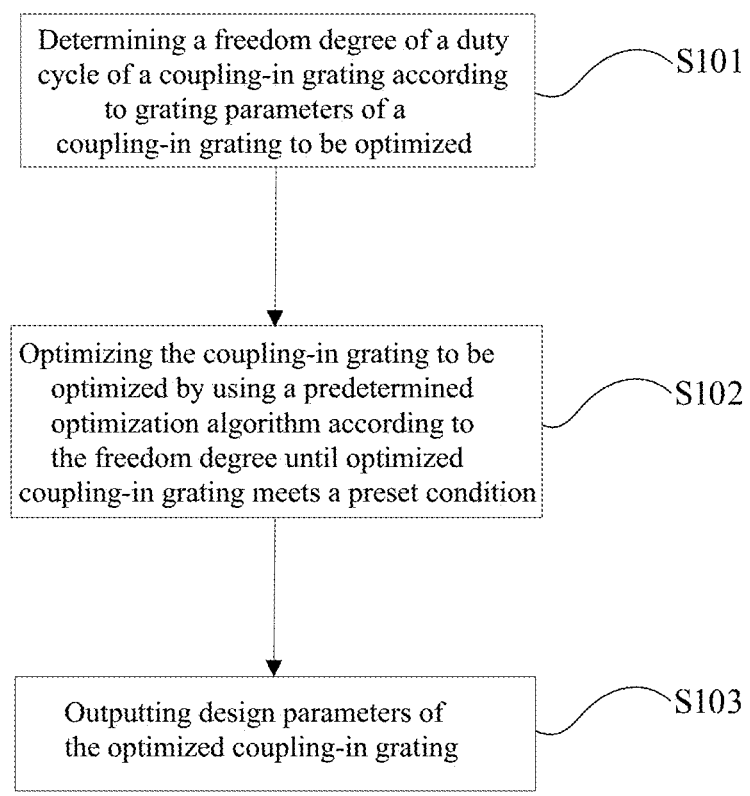
FIG. 16 shows a flow chart of a design method for a diffractive optical waveguide according to a preferred embodiment of the present disclosure.

On the other hand, the present disclosure further provides a design method for the diffractive optical waveguide 100 as described above. FIG. 16 shows a flow chart of the design method, comprising steps S101 to S103, wherein:

In step S101, the freedom degree of the duty cycle of the coupling-in grating 120 of the diffractive optical waveguide 100 is determined according to the grating parameters of the coupling-in grating to be optimized (e.g., the coupling-in grating 12 with the same period and duty cycle as shown in FIG. 2).

Wherein, the grating parameters of the coupling-in grating to be optimized include a duty cycle, a grating period and a total reflection length of the coupling-in grating to be optimized, or other suitable grating parameters. The coupling-in grating to be optimized includes a plurality of grating units with the same period and the same duty cycle.

The freedom degree of the duty cycle of the coupling-in grating 120 of the diffractive optical waveguide 100 to be determined is optionally 0.2 to 1.0, and optionally 0.4 to 0.6. In the subsequent steps, the duty cycle is adjusted within the range defined by the above freedom degree.

In step S102, the coupling-in grating to be optimized is optimized by using a predetermined optimization algorithm according to the freedom degree of the duty cycle determined in step S101 until the optimized coupling-in grating 120 meets a preset condition.

The specific preset condition may be that the diffraction efficiency and/or non-uniformity of the optimized coupling-in grating 120 reaches a preset value. Wherein the non-uniformity refers to the ratio of the minimum diffraction efficiency to the maximum diffraction efficiency in all fields of view (including the dense field of view, the intermediate field of view, and the sparse field of view as described below) of the input light 140.

The predetermined optimization algorithm may include: forward search algorithm of SA, PSO, GA or fmincon, or a feedback iteration algorithm accompanied by optimization, or other applicable algorithms.

In step S103, the design parameters of the optimized coupling-in grating 120 are output, wherein the design parameters include the number of the coupling-in grating blocks, the duty cycle of each of the coupling-in grating blocks, and an arrangement mode of the coupling-in grating blocks.

The above step S102 may include:

step S1021, determining parameters such as the number of coupling-in grating blocks of the coupling-in grating, the duty cycle of each of the coupling-in grating blocks, and the arrangement mode of coupling-in grating blocks by using a predetermined optimization algorithm;

step S1022, determining an optimized coupling-in grating model according to the above parameters;

step S1023, performing a field-of-view simulation of input light 140 for the determined coupling-in grating model, and calculating parameters such as diffraction efficiency and/or non-uniformity of the input light 140 from the simulation results;

step S1024, comparing the calculated diffraction efficiency and/or non-uniformity with the preset value.

If the calculated diffraction efficiency and/or non-uniformity reaches the preset value, the coupling-in grating model may meet the preset condition. At this time, the parameters of the optimized coupling-in grating, such as the number of coupling-in grating blocks, the duty cycle of each of the coupling-in grating blocks and the arrangement mode of the coupling-in grating blocks, may be determined and output, that is, step S103 is performed. If the calculated diffraction efficiency and/or non-uniformity does not reach the preset value, the coupling-in grating model fails to meet the preset condition. At this time, steps S1021-S1024 need to be repeated until the calculated diffraction efficiency and/or non-uniformity reaches the preset value.

Optionally, the design parameters may also include the depth of the grating.

Optionally, when the coupling-in grating block includes at least one of the following types of blocks: a slanted grating block, a multi-step single-period grating block and a blazed grating block, the design parameters also include at least one of a tilt angle of the slanted grating relative to the first surface 111 of the waveguide substrate 110, the number of steps of the multi-step single-period grating, and a first included angle between the blazed surface of the blazed grating tooth and the first surface 111 of the waveguide substrate 110.

After the above design parameters are determined, the diffractive optical waveguide 100 including the optimized coupling-in grating may be designed according to the determined design parameters.

In the process of optimization design, optimization is performed optionally by using an equal proportion scaling model of diffractive optical waveguide to be optimized. Wherein a thickness of the diffractive optical waveguide to be optimized is scaled using a first proportion, and a grating length of the coupling-in grating to be optimized is scaled using a second proportion, so as to simplify the optimization model and save optimization design time while ensuring accuracy.

The first proportion and the second proportion may be set to be the same or different, and the specific proportion may be set according to the optimization time and accuracy.

Regarding the field of view of the input light 140 mentioned above, with specific reference to FIG. 13, the input light 140 coupled into the coupling-in grating 120 of the diffractive optical waveguide from different angles will form a dense field of view, an intermediate field of view and a sparse field of view in the waveguide substrate 110 along the propagation direction of the light. Specifically, the incident direction of light ray L1 forms a positive angle with the normal line L, that is, the light ray L1 is coupled into the coupling-in grating 120 at a positive angle θ1, and +1st order diffraction angle is larger. Therefore, the distance s1 between two total reflection points in the waveguide substrate is also larger. The field of view formed by the light ray L1 is relatively sparse, which is referred to as a sparse field of view. Wherein, θ1 may optionally satisfy 0°<θ1≤30°. For example, θ1 may be specifically set to 8°, 16° or 24°, etc.

The incident direction of light ray L2 forms a negative angle with the normal line L, that is, the light ray L2 is coupled into the coupling-in grating 120 at a negative angle θ2, and the +1st order diffraction angle is smaller. Therefore, the distance s2 between two total reflection points in the waveguide substrate is also smaller. The field of view formed by the light ray L2 is relatively dense, which is referred to as a dense field of view. Wherein, θ2 may optionally satisfy −30°≤θ2<0°. For example, θ2 may be specifically set to −8°, −16° or −24°, etc.

The incident direction of light ray L3 between the light ray L1 and the light ray L2 coincides with the normal line L, that is, the light ray L3 is coupled into the coupling-in grating 120 at an angle of 0°, and its +1st order diffraction angle is between the +1st order diffraction angle of the light ray L1 and the +1st order diffraction angle of the light ray L2. Therefore, the distance s3 between two total reflection points in the waveguide substrate is also between s1 and s2. The field of view formed by the light ray L3 is between the sparse field of view and the dense field of view, which is referred to as an intermediate field of view.

Figure 13:
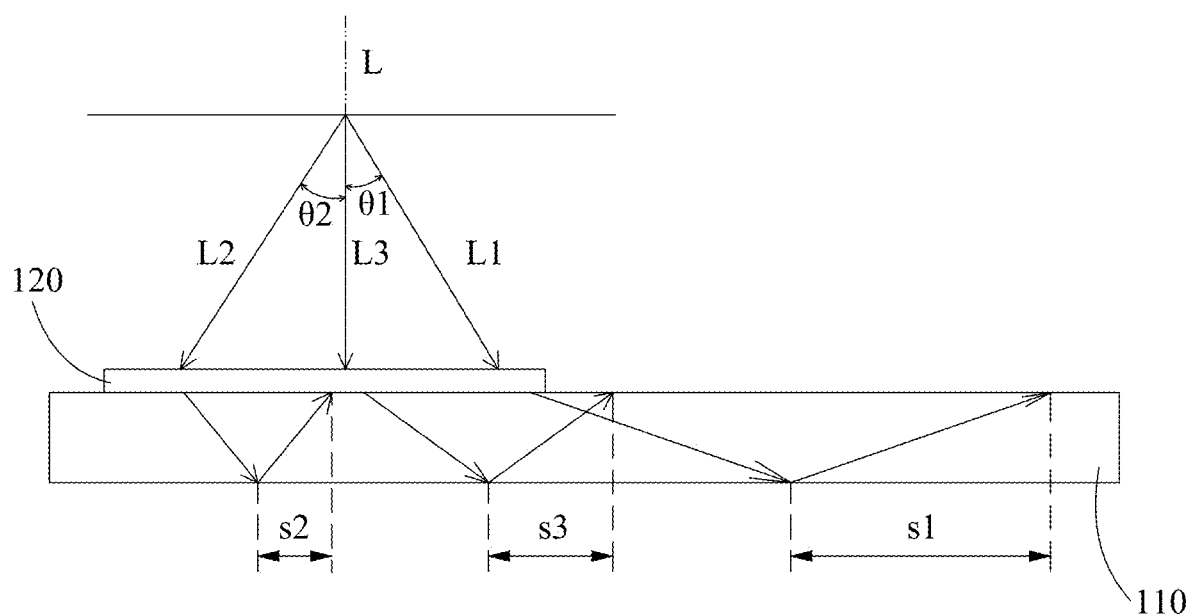
FIG. 13 shows a schematic diagram of light coupled into the coupling-in grating of the diffractive optical waveguide at different angles propagating in the diffractive optical waveguide.

It should be understood that the angle at which the light ray L3 forming the intermediate field of view is coupled into the coupling-in grating 120 is not limited to 0° as shown in FIG. 13. The angle is related to θ1 and θ2 and is approximately a middle angle within the range of the angle interval [θ2, θ1]. That is, the input light coupled into the coupling-in grating 120 at an angle of approximately (θ1+θ2)/2 forms the intermediate field of view in the waveguide substrate 110 along the propagation direction of the light.

The larger the wavelength of the input light 140, the larger the distance between its two total reflection points. The diffraction efficiency and non-uniformity of the dense field of view and the sparse field of view of the input light 140 of each wavelength coupled into the coupling-in grating 120 from different angles may be optimized by optimizing the duty cycle of the coupling-in grating 120, i.e., be optimized by the design method for the diffractive optical waveguide of the present disclosure, so as to effectively improve the diffraction efficiency and non-uniformity of the input light 140 coupled into the diffractive optical waveguide from different angles. This enables the fields of view of the input light 140 from various angles to achieve better brightness non-uniformity and color non-uniformity to effectively improve the phenomenon of different imaging brightness in different fields of view and effectively improve the comprehensive coupling-in efficiency of the coupling-in grating. Consequently, it is beneficial to improve the efficiency and non-uniformity of the entire diffractive optical waveguide.

According to the design method of the present disclosure, the coupling-in grating 12 with the same period and the same duty cycle as shown in FIG. 2 is optimized. After optimization, the coupling-in grating 120 of the present disclosure including a plurality of coupling-in grating blocks arranged randomly and continuously, with at least two of the plurality of coupling-in grating blocks having different duty cycles is obtained, such as shown in FIG. 3. Wherein, the grating periods of the coupling-in grating 12 and the coupling-in grating 120 are both 377 nm. The comparisons of the diffraction efficiency and the achievable non-uniformity of different fields of view of the input light 140 with a certain wavelength by the coupling-in grating 12 and the coupling-in grating 120 are shown in Table 1 below.

cycle. Therefore, the average diffraction efficiency of each field of view of the green light from the dense field of view to the sparse field of view is greatly improved.

For 460 nm blue light, although the average diffraction efficiency of the optimized coupling-in grating 120 is basically equivalent to that of the coupling-in grating 12 with the same duty cycle, the coupling-in grating 120 has a certain suppression on the brighter sparse field of view (including the field of view formed by the blue light coupled into the coupling-in grating at an angle of 0°) of the blue light, so that the non-uniformity of the blue light is significantly improved.

In addition, it can be further seen from above Table 1 that the optimized coupling-in grating 120 may significantly improve the average diffraction efficiency of green light. This is because at least two of the optimized plurality of coupling-in grating blocks have different duty cycles, and the coupling-in grating 120 with the duty cycle of the at least two coupling-in grating blocks in the range of 0.4 to 0.6 has a significant improvement in the total reflection efficiency of the coupling-in light lay corresponding to the intermediate field of view of green light, such as an improvement of more than 30%, compared to the coupling-in grating 12 with a fixed duty cycle of 0.6.

Table 2 below shows the diffraction efficiency and the achievable non-uniformity of each input light of the coupling-in grating 120 optimized according to the design method of the present disclosure, the coupling-in grating 12 with the same duty cycle, and the coupling-in grating 16 with a gradual change (gradually decreasing) duty cycle

TABLE 1

| | | Optimized Coupling-in Grating 120 of the Present Disclosure | | | Coupling-in Grating 12 with the Same Duty Cycle | |
|---|---|---|---|---|---|---|
| Wavelength/ nm | Coupling-in Angle/° | Diffraction Efficiency/% | Average Diffraction Efficiency/% | Non-uniformity | Average Diffraction Efficiency/% | Non-uniformity |
| 620 | +12 | 18.7 | 10.1 | 0.241 | 8.9 | 0.185 |
| | 0 | 7.1 | | | | |
| | −12 | 4.5 | | | | |
| 530 | +12 | 16.2 | 13.4 | 0.611 | 9.5 | 0.909 |
| | 0 | 14.2 | | | | |
| | −12 | 9.9 | | | | |
| 460 | +12 | 11.1 | 11.3 | 0.672 | 11.8 | 0.5 |
| | 0 | 9.2 | | | | |
| | −12 | 13.7 | | | | |

It can be seen from Table 1 that for 620 nm red light, the coupling-in grating 120 optimized according to the design method of the present disclosure has a significantly improved diffraction efficiency for the dense field of view of the above red light (including the field of view formed by the red light coupled into the coupling-in grating at an angle of +12°) compared to the coupling-in grating 12 with the same duty cycle, thereby effectively improving the average diffraction efficiency of each field of view of the red light from the dense field of view to the sparse field of view.

Figure 14:
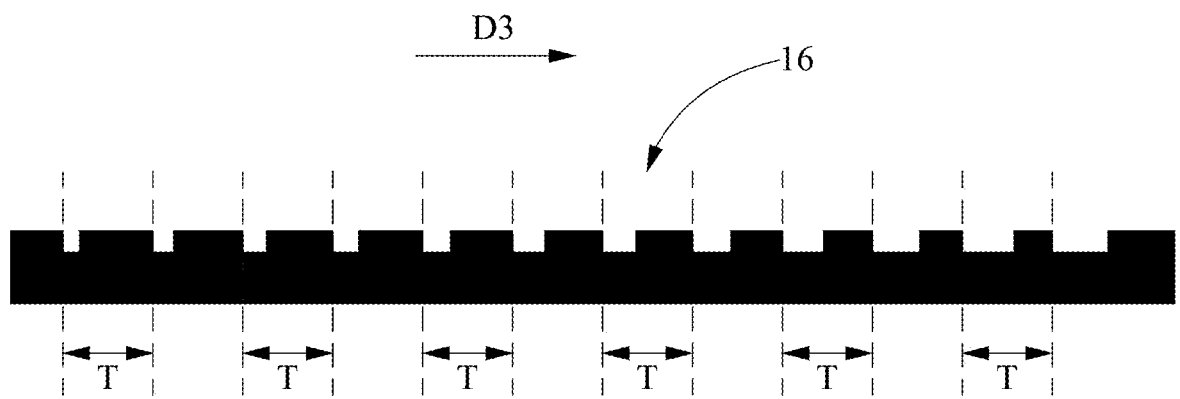
FIG. 14 shows a schematic diagram of a coupling-in grating with a gradually changing duty cycle.
Figure 15:
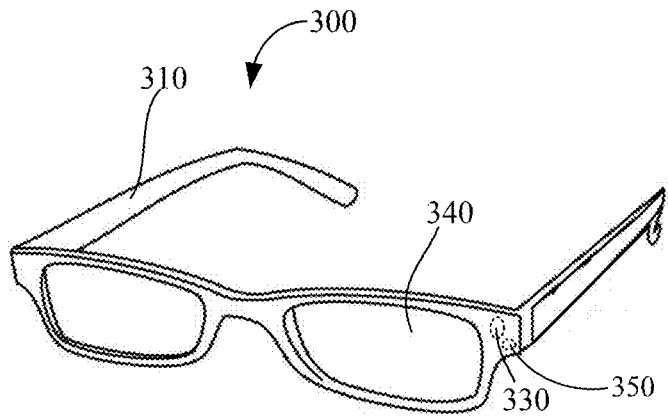
FIG. 15 shows a schematic diagram of an exemplary display device.

For 530 nm green light, the optimized coupling-in grating 120 has significantly improved diffraction efficiencies for the dense field of view (including the field of view formed by the green light coupled into the coupling-in grating at an angle of +12°) and the intermediate field of view (including the field of view formed by the green light coupled into the coupling-in grating at an angle of 0°) of the green light, compared to the coupling-in grating 12 with the same duty along the third direction D3 as shown in FIG. 14. Wherein, the grating periods of the coupling-in gratings 120, 12 and 16 are all 368 nm.

TABLE 2

| | | Optimized Coupling-in Grating 120 | Coupling-in Grating 16 with a Gradual Duty Cycle | Coupling-in Grating 12 with the Same Duty Cycle |
|---|---|---|---|---|
| Average Diffraction Efficiency/% | Red Light | 9.3 | 8.3 | 7.8 |
| | Green Light | 11.9 | 9.1 | 11.6 |
| | Blue Light | 9.3 | 9.0 | 8.6 |
| Non-uniformity | Red Light | 0.471 | 0.369 | 0.340 |
| | Green Light | 0.596 | 0.552 | 0.406 |
| | Blue Light | 0.721 | 0.676 | 0.505 |

It can be seen from Table 2 that the coupling-in grating 120 optimized according to the design method of the present disclosure has higher diffraction efficiency and non-uniformity for input light of each wavelength compared to the coupling-in grating 16 with a gradual duty cycle and the coupling-in grating 12 with the same duty cycle.

In still another aspect, the present disclosure further provides a display device 300, which may comprise the aforementioned diffractive optical waveguide 100, wherein the description of the diffractive optical waveguide 100 may be referenced from the above and will not be repeated here.

The display device may be any device comprising the aforementioned diffractive optical waveguide 100. For example, referring to FIG. 15, the display device may be a near-eye display device, which may comprise a lens 340 and a frame 310 for holding the lens 340 close to the eyes. The lens 320 includes the aforementioned diffractive optical waveguide 100.

In some examples, the display device 300 may further comprise an optical machine 330. Optionally, the optical machine 330 may project image light onto the diffractive optical waveguide 100, e.g., into the coupling-in region 113 where the coupling-in grating 120 of the diffractive optical waveguide 100 is located. The optical machine 330 may be micro displays, such as a laser beam scanning (LBS), a digital light procession (DLP), a digital micromirror device (DMD), a liquid crystal on silicon (LCOS), a micro electromechanical system (MEMS), an organic light emitting diode (OLED), a Micro LED optical machine, or the like. The light emitted by the optical machine 330 is visible light.

Further, the display device 300 may also comprise a driving device 350 for driving the optical machine 330 to project image light onto the coupling-in grating 120 of the diffractive optical waveguide 100. The driving device 350 may comprise a driving circuit. The driving circuit may include a MOSFET, a capacitor, a resistor or other suitable components. The display device 300 may further comprise a controller that is electrically connectable to the driving circuit. The driving device 350 is controlled via the controller to drive the optical machine 330 to project image light onto the coupling-in grating 120 of the diffractive optical waveguide 100.

Optionally, the area of the coupling-in region 113 may be greater than or equal to the area of the light spot projected to the coupling-in region 113 by the optical machine 330. Optionally, the optical axis of the image light projected by the optical machine 330 is perpendicular to the surface of the waveguide substrate 110 of the diffractive optical waveguide 100, so as to ensure the quality of the final image.

The light (e.g., image light) projected by the optical machine 330 toward the diffractive optical waveguide 100 is coupled into the waveguide substrate 110 via the coupling-in grating 120 and totally reflected to the coupling-out grating 130. The light is coupled out via the coupling-out grating 130 and enters the eyes of viewer wearing the near-eye device, thereby enabling the viewer to see the image projected by the optical machine 330.

In some embodiments, the display device 300 is an augmented reality display device or a virtual reality display device, wherein the augmented reality display device includes, but is not limited to, the devices such as augmented reality (AR) glasses, an in-vehicle head-up display (HUD), or the like.

It should be noted that the above-described embodiments are intended to illustrate but not limit the disclosure, and alternative embodiments may be devised by those skilled in the art without departing from the scope of the appended claims. In the claims, any reference signs in parentheses shall not be construed as limiting the claims. The disclosure may be implemented by means of hardware comprising several different elements as well as by means of a suitably programmed computer. In a unit claim listing several devices, some of these devices may be presented by the same item of hardware. The use of the words, such as first, second, and third, does not denote any order. These words may be interpreted as names.

What is claimed is:

1. A diffractive optical waveguide for optical pupil expansion, comprising:
    a waveguide substrate comprising a coupling-in region;
    a coupling-in grating disposed on or in the waveguide substrate and located in the coupling-in region, and configured to couple input light into the waveguide substrate to cause the input light to propagate within the waveguide substrate through total reflection;
    wherein the coupling-in grating comprises a plurality of coupling-in grating blocks arranged randomly and continuously, the plurality of coupling-in grating blocks have the same period, and at least two coupling-in grating blocks of the plurality of coupling-in grating blocks have different duty cycles, wherein,
    a first coupling-in grating block of the at least two coupling-in grating blocks comprises a plurality of grating units, and each grating unit of the first coupling-in grating block has a first duty cycle,
    a second coupling-in grating block of the at least two coupling-in grating blocks comprises a plurality of grating units, and each grating unit of the second coupling-in grating block has a second duty cycle,
    the first duty cycle is different from the second duty cycle;
    wherein in a first direction, a duty cycle of at least one third coupling-in grating block of the plurality of coupling-in grating blocks is greater than duty cycles of two coupling-in grating blocks adjacent to the at least one third coupling-in grating block along the first direction, and the third coupling-in grating block is located between the first coupling-in grating block and the second coupling-in grating block; and/or
    in a second direction, a duty cycle of at least one fourth coupling-in grating block of the plurality of coupling-in grating blocks is smaller than duty cycles of two coupling-in grating blocks adjacent to the at least one fourth coupling-in grating block along the second direction, and the fourth coupling-in grating block is located between the first coupling-in grating block and the second coupling-in grating block.

2. The diffractive optical waveguide for optical pupil expansion of claim 1, wherein gratings of the plurality of coupling-in grating blocks have the same depth, and each of the plurality of coupling-in grating blocks comprises a plurality of grating units with the same depth; or
    the gratings of at least two coupling-in grating blocks of the plurality of coupling-in grating blocks have different depths, and each of the at least two coupling-in grating blocks comprises a plurality of grating units with the same depth.

3. The diffractive optical waveguide for optical pupil expansion of claim 1, wherein at least one of the plurality of coupling-in grating blocks is a rectangular grating block, a slanted grating block, a multi-step single-period grating block or a blazed grating block; and/or
    the types of the plurality of coupling-in grating blocks are the same or different.

4. The diffractive optical waveguide for optical pupil expansion of claim 3, wherein when at least two coupling-in grating blocks of the plurality of coupling-in grating blocks are slanted grating blocks, slanted gratings of the at least two coupling-in grating blocks have different tilt angles relative to a first surface of the waveguide substrate, and each of the at least two coupling-in grating blocks comprises a plurality of grating units with the same tilt angle.

5. The diffractive optical waveguide for optical pupil expansion of claim 3, wherein when at least two coupling-in grating blocks of the plurality of coupling-in grating blocks are multi-step single-period grating blocks, multi-step single-period gratings of the at least two coupling-in grating blocks have a different number of steps, and each of the at least two coupling-in grating blocks comprises a plurality of grating units with the same number of steps.

6. The diffractive optical waveguide for optical pupil expansion of claim 3, wherein when at least two coupling-in grating blocks of the plurality of coupling-in grating blocks are blazed grating blocks, first included angles between blazed surfaces of blazed grating teeth of the at least two coupling-in grating blocks and the first surface of the waveguide substrate are different, and each of the at least two coupling-in grating blocks comprises a plurality of grating units with the same first included angle.

7. The diffractive optical waveguide for optical pupil expansion of claim 1, wherein the number of the coupling-in grating blocks is 20 to 300; and/or
the number of the grating units in each of the plurality of coupling-in grating blocks is 50 to 150.

8. The diffractive optical waveguide for optical pupil expansion of claim 1, wherein the coupling-in grating blocks directly irradiated by the input light have a duty cycle of 0.2 to 0.8; and/or
the coupling-in grating blocks not directly irradiated by the input light have a duty cycle of 0.2 to 1.0.

9. The diffractive optical waveguide for optical pupil expansion of claim 1, wherein the coupling-in grating is a transmission coupling-in grating or a reflection coupling-in grating; and/or
the coupling-in grating is a one-dimensional grating, a two-dimensional grating, or a combination grating of a one-dimensional grating and a two-dimensional grating.

10. The diffractive optical waveguide for optical pupil expansion of claim 1, wherein the first direction is the same as or different from the second direction.

11. A design method for the diffractive optical waveguide of claim 1, comprising:
S101: determining a freedom degree of a duty cycle of a coupling-in grating of the diffractive optical waveguide according to grating parameters of a coupling-in grating to be optimized, wherein the grating parameters include a duty cycle, a period and a total reflection length of the coupling-in grating to be optimized, and the coupling-in grating to be optimized comprises a plurality of grating units with the same period and the same duty cycle;
S102: optimizing the coupling-in grating to be optimized by using a predetermined optimization algorithm according to the freedom degree until optimized coupling-in grating meets a preset condition;
S103: outputting design parameters of the optimized coupling-in grating, wherein the design parameters include the number of the coupling-in grating blocks, the duty cycle of each of the coupling-in grating blocks, and an arrangement mode of the coupling-in grating blocks.

12. The design method of claim 11, wherein the step that until the optimized coupling-in grating meets a preset condition comprises: the diffraction efficiency and/or non-uniformity of the optimized coupling-in grating reaches a preset value.

13. The design method of claim 11, wherein the predetermined optimization algorithm comprises: forward search algorithm of SA, PSO, GA or fmincon, or a feedback iteration algorithm accompanied by optimization.

14. The design method of claim 11, wherein optimization is performed by using an equal proportion scaling model of a diffractive optical waveguide to be optimized, wherein a thickness of the diffractive optical waveguide to be optimized is scaled using a first proportion, and a grating length of the coupling-in grating to be optimized is scaled using a second proportion.

15. The design method of claim 11, wherein the freedom degree of the duty cycle is 0.2 to 1.0.

16. The design method of claim 15, wherein the freedom degree of the duty cycle is 0.4 to 0.6.

17. A display device, comprising:
the diffractive optical waveguide of claim 1, an optical machine, and a driving device configured to drive the optical machine to project image light onto the coupling-in grating of the diffractive optical waveguide.

18. The display device of claim 17, wherein an optical axis of the image light projected by the optical machine is perpendicular to a surface of the waveguide substrate of the diffractive optical waveguide.

19. The display device of claim 17, wherein the display device is a near-eye display device comprising a lens including the diffractive optical waveguide and a frame for holding the lens close to eyes.

20. The display device of claim 17, wherein the display device is an augmented reality display device or a virtual reality display device.

* * * * *